United States Patent
Kai et al.

(10) Patent No.: US 7,368,700 B2
(45) Date of Patent: May 6, 2008

(54) OPTICAL SWITCH APPARATUS AND OPTICAL SWITCHING SYSTEM

(75) Inventors: Yutaka Kai, Kawasaki (JP); Yasuhiko Aoki, Kawasaki (JP); Eric Gouardes, Paris (FR); Yoshiaki Nakano, Tokyo (JP)

(73) Assignees: Fujitsu Limited, Kawasaki (JP); The University of Tokyo, Tokyo (JP)

( * ) Notice: Subject to any disclaimer, the term of this patent is extended or adjusted under 35 U.S.C. 154(b) by 140 days.

(21) Appl. No.: 11/377,219

(22) Filed: Mar. 17, 2006

(65) Prior Publication Data

US 2006/0219870 A1 Oct. 5, 2006

(30) Foreign Application Priority Data

Mar. 31, 2005 (JP) .............................. 2005-102765

(51) Int. Cl.
*H01J 40/14* (2006.01)
*H04J 14/00* (2006.01)

(52) U.S. Cl. ............................ 250/214 R; 250/214 LS; 385/17; 385/31; 398/45; 398/51

(58) Field of Classification Search ............ 250/214 R, 250/214 LS, 227.11; 385/16–17, 31, 45; 398/45, 47–49, 51, 53; 359/322–323
See application file for complete search history.

(56) References Cited

U.S. PATENT DOCUMENTS

| 5,974,216 A | 10/1999 | Nakaya | 385/140 |
| 6,411,430 B1 | 6/2002 | Ogino et al. | 359/337.11 |
| 6,504,966 B2 | 1/2003 | Kato et al. | 385/16 |
| 2004/0052525 A1* | 3/2004 | Ovadia | 398/47 |
| 2006/0222289 A1* | 10/2006 | Takita et al. | 385/17 |

FOREIGN PATENT DOCUMENTS

| JP | 7-212315 | 8/1995 |
| JP | 10-228007 | 8/1998 |
| JP | 2000-114629 | 4/2000 |
| JP | 2000-269892 | 9/2000 |
| JP | 2002-318398 | 10/2002 |
| JP | 2003-185984 | 7/2003 |

* cited by examiner

*Primary Examiner*—Kevin Pyo
(74) *Attorney, Agent, or Firm*—Staas & Halsey LLP

(57) ABSTRACT

In an optical switch apparatus which continuously carries out the route switching on frame signal light inputted from various routes while eliminating differences in output power value, a first delaying unit, which is interposed between a first branching unit and an input terminal, delays the input of the frame signal light to a switch module until the drive voltage supply control on the frame signal light in a drive voltage supply control unit reaches a stable condition.

16 Claims, 12 Drawing Sheets

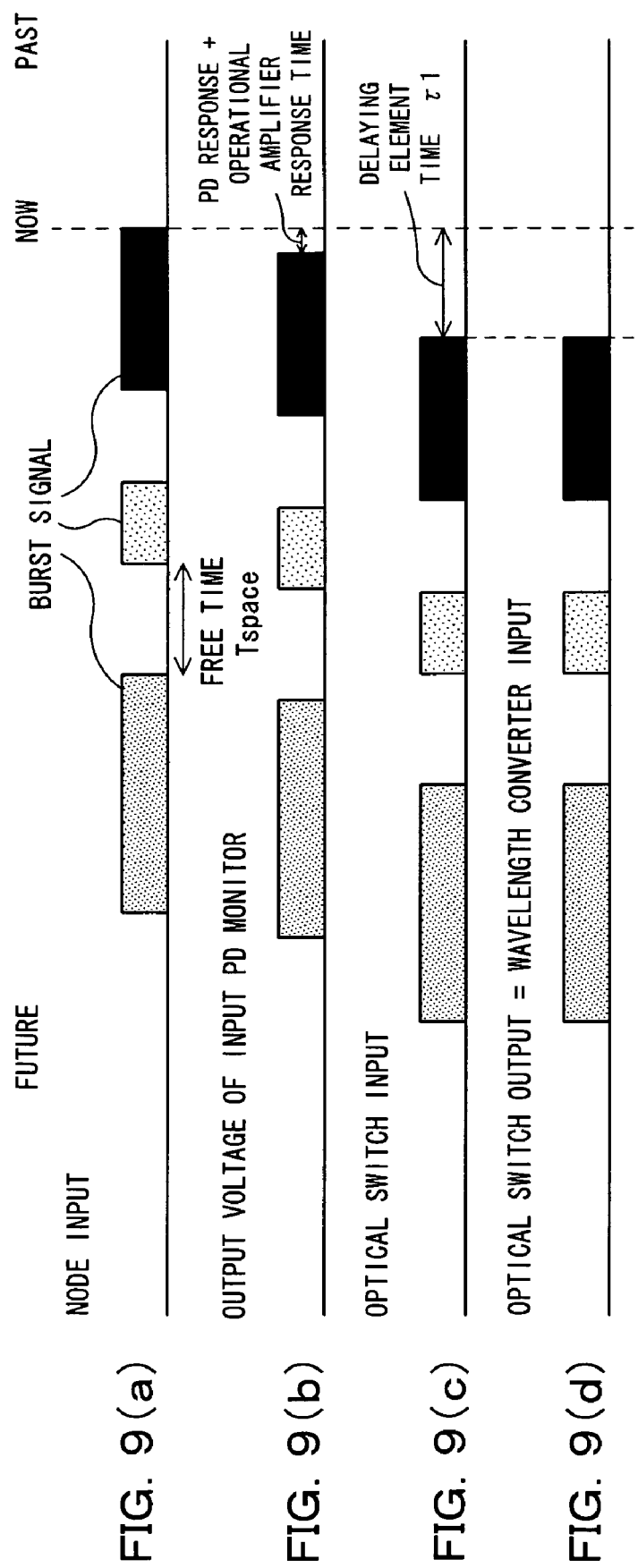

FIG. 10

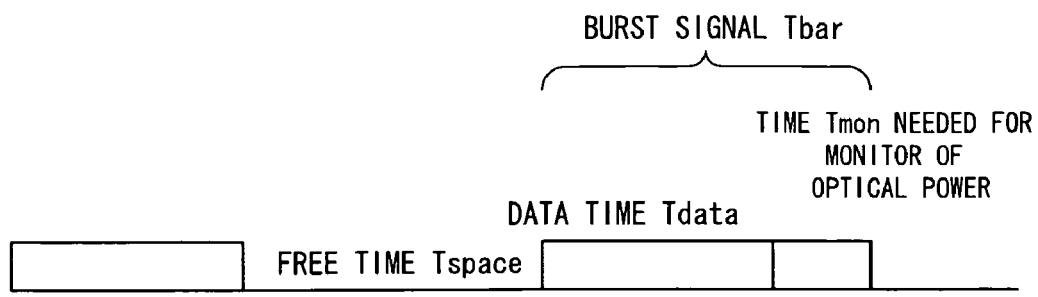

FIG. 11

| IN-NODE PROCESSING TIME Tcal (CALCULATION FOR VOA CONTROL, AND OTHERS) | SWITCH ELEMENT RESPONSE TIME Tres | SWITCH ELEMENT DRIVE TIME Tdrv | PORT CONNECTION INFORMATION COMMUNICATION TIME Tcom |
|---|---|---|---|

FIG. 12

| | PARALLEL PROCESSING IS POSSIBLE (INDIVIDUAL MONITORING AND SWITCHING). | ONLY ONE-BY-ONE PROCESSING IS POSSIBLE (REPEATED OPERATION OF MONITORING → SWITCHING) |
|---|---|---|
| CONDITION 1 | $\tau \geq \tau min$ | $Tspace + Tbar \geq \tau \geq \tau min$ |
| CONDITION 2 | $\tau min = Tcal + Tres + Tdrv + Tcom$ ||
| CONDITION 3 | $Tlimit > Tsapce \geq Tres + Tdrv$ ||
| CONDITION 4 | $Tbar \geq Tcom$ ||

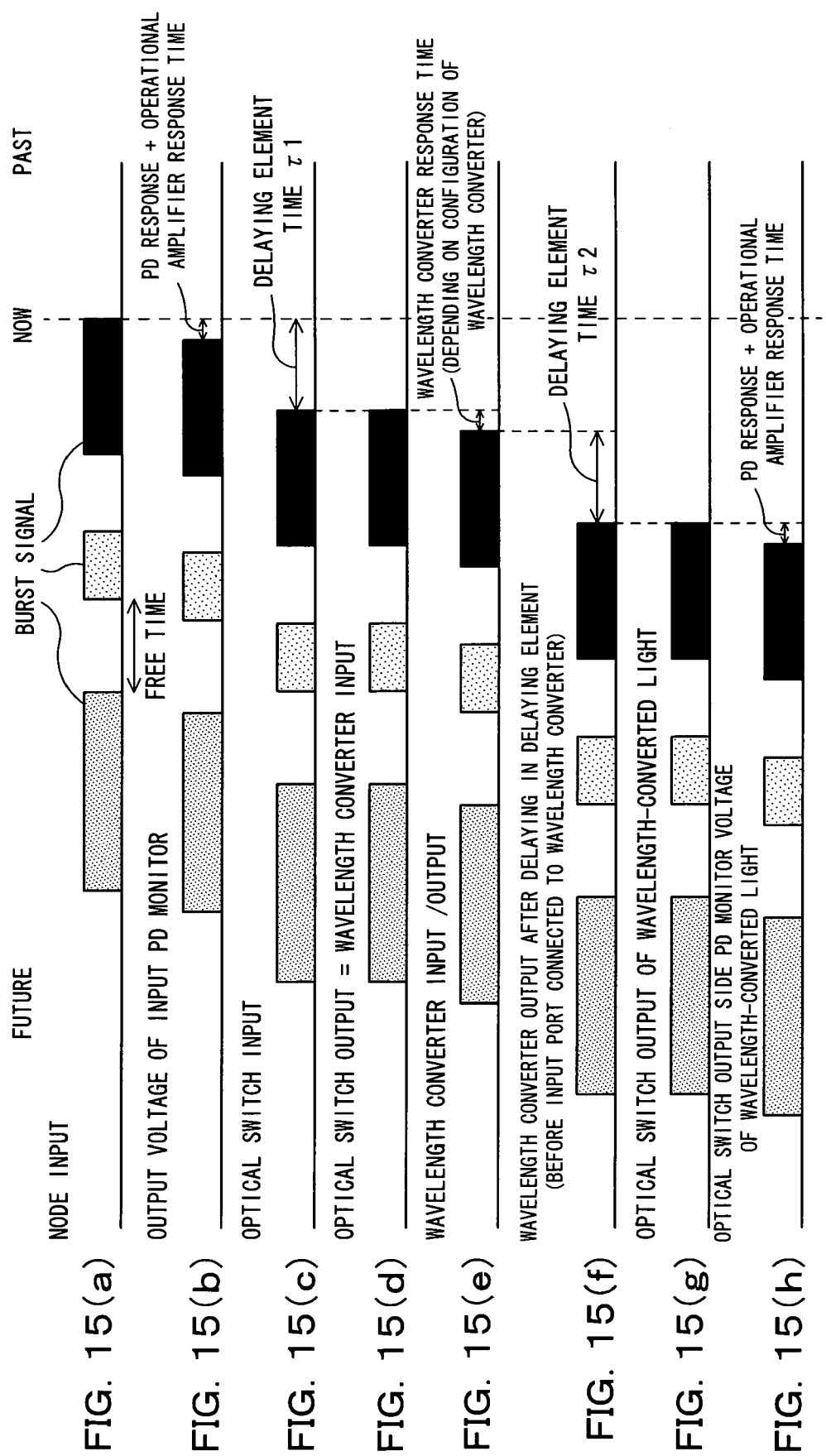

OPTICAL SWITCH APPARATUS AND OPTICAL SWITCHING SYSTEM

BACKGROUND OF THE INVENTION

1) Field of the Invention

The present invention relates to an optical switch apparatus and optical switching system suitable for constructing an optical communication system capable of handling a large volume of information in the form of optical signal without temporarily carrying out a conversion into an electric signal, and more particularly to an optical switch apparatus and optical switching system suitable for use in a network designed to conduct optical burst signal processing.

2) Description of the Related Art

In the case of a photonic network in a metroaccess area, a network configuration is frequently changed through switching/route switching on lines or signals for ADM (Add Drop Multiplexing) or the like. In the present networks, many repeating stages have employed a configuration to carry out signal switching by conducting a conversion into an optical signal after an optical signal is once converted into an electric signal.

However, in the future, from the viewpoint of improvement of performance of a network, it is expectable to achieve the replacement with a dynamic OADM (Optical Add Drop Multiplexing) device made to demultiplex only desired wavelengths as an optical signal is kept intact, an optical cross connect node made to conduct the switching of input/output routes in units of wavelengths in the form of an optical signal or other devices in light of speeding-up of switching processing.

In addition, in the next generation, for the enhancement of line using efficiency, it is considered that there is a need to provide a function whereby an optical signal is divided into frames each having a given length and switching/route switching processing (in this specification, a general term of these processing will be described as optical burst signal processing) is conducted in units of the divided frames as an optical signal is kept intact.

In a transmission apparatus made to handle such optical burst signal processing, for carrying out the switching or route switching in units of frames as mentioned above, it is expected to conduct the switching processing in a time dimension smaller than at least milli-second dimensions.

As well-known techniques related to the present invention, there are the following patent documents 1 to 6.

(Patent Document 1) Japanese Patent Laid-Open No. 2002-318398

(Patent Document 2) Japanese Patent Laid-Open No. 2003-185984

(Patent Document 3) Japanese Patent Laid-Open No. 2000-114629

(Patent Document 4) Japanese Patent Laid-Open No. 2000-269892

(Patent Document 5) Japanese Patent Laid-Open No. HEI 7-212315

(Patent Document 6) Japanese Patent Laid-Open No. HEI 10-228007

Assuming that, as described above, the switching processing is conducted in units of frames in a time dimension smaller than milli-second dimensions, there is a need to continuously conduct the route switching on frame signal lights inputted from various routes. At this time, due to differences in input power, differences in loss among optical switch ports and other factors, differences in output power value of the frame signal light occurs among the output ports, which can create troubles in a case in which error-free reception is made in an optical receiver.

The techniques described in the above-mentioned patent documents 1 to 6 do not disclose a configuration designed to eliminate the differences in frame signal light output power value among output ports in the case of carrying out the switching processing in units of frames in a time dimension smaller than milli-second dimensions.

Although the foregoing patent documents 3 to 6 disclose a variable optical attenuator which variably controls an attenuation quality of output light in a feedback fashion, in the case of such feedback control, difficulty is encountered in executing control so as to make the output power value constant on frame signal light for conducting the switching processing in a time dimension smaller than milli-second dimensions. This is because the signal light passes through it at the time that the feedback control takes place.

In a switch node in which the route switching is conducted through the use of such optical burst signal processing, if the optical route switching can be conducted without carrying out the optical-electrical-optical conversion and the output power can be made constant, it is possible to facilitate a design of network apparatus (in particular, downstream-side apparatus) other than this switch node. In addition, in this switch node, if the wavelength switching can be conducted for each frame signal light, it is possible to construct a more-flexible photonic network.

SUMMARY OF THE INVENTION

The present invention has been developed in consideration of these problems, and it is therefore an object of the invention to continuously carry out the route switching on frame signal light inputted from various routes while eliminating differences in output power value.

Another object of the invention is to eliminate differences in optical power through a response in a time dimension smaller than milli-seconds.

A further object of the invention is to carry out an optical wavelength conversion in units of frame signal light.

For these purposes, in accordance with the present invention, there is provided an optical switch apparatus designed to output frame signal light from a plurality of input ports to any one of a plurality of output ports in a switching fashion, comprising a switch module for deflecting frame signal light from each of input terminals associated with the input ports through the use of supply of a drive voltage to output the frame signal light to one of output terminals associated with the plurality of output ports in a switching fashion, a plurality of first branching units interposed between the input ports and the input terminals for carrying out a branch on a portion of the frame signal light from the input ports to the switch module, a plurality of first input power monitors for monitoring optical power of the branched frame signal light from each of the first branching units, a drive voltage supply control unit for controlling supply of a drive voltage to the switch module on the basis of a result of the monitor of the frame signal light from each of the first input power monitors so as to control an optical route for the frame signal light, and first delaying units for delaying input of the frame signal light to the switch module until the drive voltage supply control on the frame signal light in the drive voltage supply control unit reaches a stable condition, with each of the first delaying units being interposed between the first branching units and the input terminals, respectively.

More preferably, the drive voltage supply control unit is made to control the supply of the drive voltage to the switch module for controlling, in addition to the optical route for the frame signal light, output power of the frame signal light to be outputted from the output ports on the basis of a result of the monitor of the frame signal light from the input power monitors.

Moreover, it is also appropriate that the drive voltage supply control unit includes control information storing unit for storing control information for setting optical routes through which the frame signal light propagate between the plurality of input ports and the plurality of output ports, a drive voltage control unit for making reference to the contents of the control information storing unit on the basis of the monitor result to output a control signal for controlling a drive voltage to be supplied to the switch module so as to control the optical routes of the frame signal light and output power of the frame signal light to be outputted from the output ports, and a drive voltage supplying unit for supplying, to the switch module, the drive voltage controlled by the control signal from the drive voltage control unit.

Still moreover, preferably, the drive voltage supply control unit is made to receive, in addition to the optical route setting information on the frame signal light, target output power information on frame signal light to be outputted from the output ports as frame signal light control information transmitted together with the frame signal light.

Yet moreover, it is also acceptable that the optical switch apparatus further comprises an updating unit for making reference light pass through an optical route set by supplying a drive voltage based on control information on an object of updating in the control information storing unit to the switch module to update the contents of the control information on the object of updating in the control information storing unit on the basis of input/output power characteristics of the reference light passing through the optical route.

In this case, it is also acceptable that the updating unit includes a reference light outputting unit for outputting the reference light to the input terminal constituting the optical route of the object of updating in the switch module, a reference light monitoring unit for monitoring an output power characteristic from the output terminal constituting the optical route of the object of updating in the switch module, and an updating control unit for controlling the updating of control information on the object of updating in the control information storing unit on the basis of a result of the monitor from the reference light monitoring unit.

In addition, preferably, the reference light outputting unit outputs, as the reference light, light in a wavelength band (waveband) other than the wavelengths of the signal light to the plurality of input-side deflecting units.

Still additionally, the optical switch apparatus according to the present invention further comprises a wavelength converter for carrying out a wavelength conversion on the frame signal light outputted through one of the output terminals in the switch module so that the frame signal light wavelength-converted by the wavelength converter is inputted to one of the input terminals in the switch module.

In this case, it is appropriate that the optical switch apparatus according to the present invention further comprises a second branching unit interposed between the output of the wavelength converter and one of the input terminals of the switch module for carrying out a branch on a portion of the frame signal light from the wavelength converter to the switch module, a second input power monitor for monitoring the optical power of the branched frame signal light from the second branching unit so that, on the basis of a result of the monitor of the wavelength-converted signal light from the second input power monitor, the drive voltage supply control unit controls the supply of the drive voltage to the switch module to control the optical route of the frame signal light, and a second delaying unit interposed between the second branching unit and the one input terminal for delaying the input of the frame signal light to the switch module until the supply control of the drive voltage on the frame signal light in the drive voltage supply control unit reaches a stable condition.

Yet additionally, it is also appropriate that the optical switch apparatus according to the present invention further comprises an optical frequency monitoring circuit for monitoring an optical frequency of the frame signal light wavelength-converted by the wavelength converter.

In this case, it is also appropriate that the optical switch apparatus according to the present invention further comprises a wavelength feedback control unit for feedback-controlling the wavelength converter on the basis of a result of the monitor by the optical frequency monitoring circuit so as to make a correction on a difference (departure) occurring between the wavelength of the frame signal light after wavelength-converted and an output light wavelength forming a target of conversion in the wavelength converter.

Furthermore, the optical switch apparatus according to the present invention further comprises an output power monitor for monitoring optical power of the frame signal light to be led from the output terminals to the output ports in the switch module and a passage detecting unit for detecting the passage of the frame signal light from the output terminals to the output ports in the switch module on the basis of a result of the monitor by the output power monitor so that, when the passage detecting unit detects the passage of the frame signal light, the drive voltage supply control unit resets the control on the supply of the drive voltage to the switch module for the frame signal light.

Still furthermore, it is also acceptable that the drive voltage supply control unit carries out the feedback control to correct the differences between the output power of the frame signal light to be led to the output ports and a target output power of the frame signal light to be outputted from the output ports on the basis of a result of the output power monitor by the output power monitor.

Yet furthermore, it is also possible that the optical switch apparatus according to the present invention further comprises an input edge detecting circuit for detecting an input edge of the frame signal light on the basis of a result of the monitor from the first input power monitor so that, when the input edge detecting circuit detects the input edge, the drive voltage supply control unit starts the supply control on the drive voltage to the switch module.

Moreover, it is also appropriate that the drive voltage supply control unit receives trigger information for the start of the control on the drive voltage supply to the switch module as frame signal light control information transmitted together with the frame signal light.

In addition, in accordance with a further aspect of the present invention, there is provided an optical switching system made up of a transmission node for transmitting frame signal light in which transmitted data is modulated, a reception node for receiving the frame signal light from the transmission node through a network and an optical switching node for setting a path provided on the network, through which the frame signal light propagates, in a switching fashion, wherein the optical switching node comprises a monitoring unit for monitoring optical power of the frame signal light inputted from the transmission node and a power adjusting unit for variably adjusting the optical power of the frame signal light to the reception node, and the transmission node comprises a bit pattern processing unit for processing a bit pattern of the transmitted data to stabilize the optical power of the frame signal light to be monitored in the monitoring unit and a frame signal light producing unit for producing frame signal light to be transmitted on the basis of the bit pattern processed by the bit pattern processing unit.

In this case, it is also possible that the bit pattern processing unit inserts a formalized bit pattern longer than a response time in the monitoring unit into the head or end of the bit pattern of the transmitted data. Moreover, it is also appropriate that a bit conversion is made on the bit pattern of the transmitted data so that a mark rate of the transmitted data substantially becomes constant.

Still additionally, the aforesaid optical switching node forms an optical switch apparatus made to output frame signal light from a plurality of input ports to any one of a plurality of output ports in a switching fashion, and the optical switch apparatus comprises a switch module for deflecting frame signal light from each of input terminals associated with the input ports through the use of supply of a drive voltage to output the frame signal light to one of output terminals associated with the plurality of output ports in a switching fashion, a plurality of first branching units interposed between the input ports and the input terminals for carrying out a branch on a portion of the frame signal light from the input ports to the switch module, a plurality of first input power monitors for monitoring optical power of the branched frame signal light from the first branching units, a drive voltage supply control unit for controlling supply of a drive voltage to the switch module on the basis of a result of the monitor of the frame signal light from the first input power monitors so as to control an optical route for the frame signal light, and first delaying units for delaying input of the frame signal light to the switch module until the drive voltage supply control on the frame signal light in the drive voltage supply control unit reaches a stable condition, with each of the first delaying units being interposed between the first branching units and the input terminals, respectively.

As described above, the present invention provides an advantage to continuously carry out the route switching on frame signal lights inputted from various routes while eliminating differences in output power value.

In addition, the present invention provides an advantage to eliminate differences in optical power through a response in a time dimension smaller than milli-seconds.

BRIEF DESCRIPTION OF THE DRAWINGS

FIGS. 9(*a*) to 9(*d*) are illustrations useful for explaining an operation of the optical switch apparatus according to the first embodiment of the present invention while taking note of frame signal light;

FIGS. 10 to 12 are illustrations useful for explaining setting of a delay time τ1 by an optical delaying element, an interval of frame signal light to be intermittently transmitted and a frame length of frame signal light;

FIGS. 15(*a*) to 15(*h*) are illustrations useful for explaining an operation of the optical switch apparatus according to the second embodiment of the present invention while taking note of frame signal light.

DESCRIPTION OF THE PREFERRED EMBODIMENTS

Embodiments of the present invention will be described hereinbelow with reference to the drawings.

In addition to the above-mentioned purposes of the present invention, other technical objects, problem-solving means and features of the present invention will become more readily apparent from the following description of the embodiments.

[A] Description of First Embodiment

[A-1] Configuration of Optical Switching System

Figure 1:
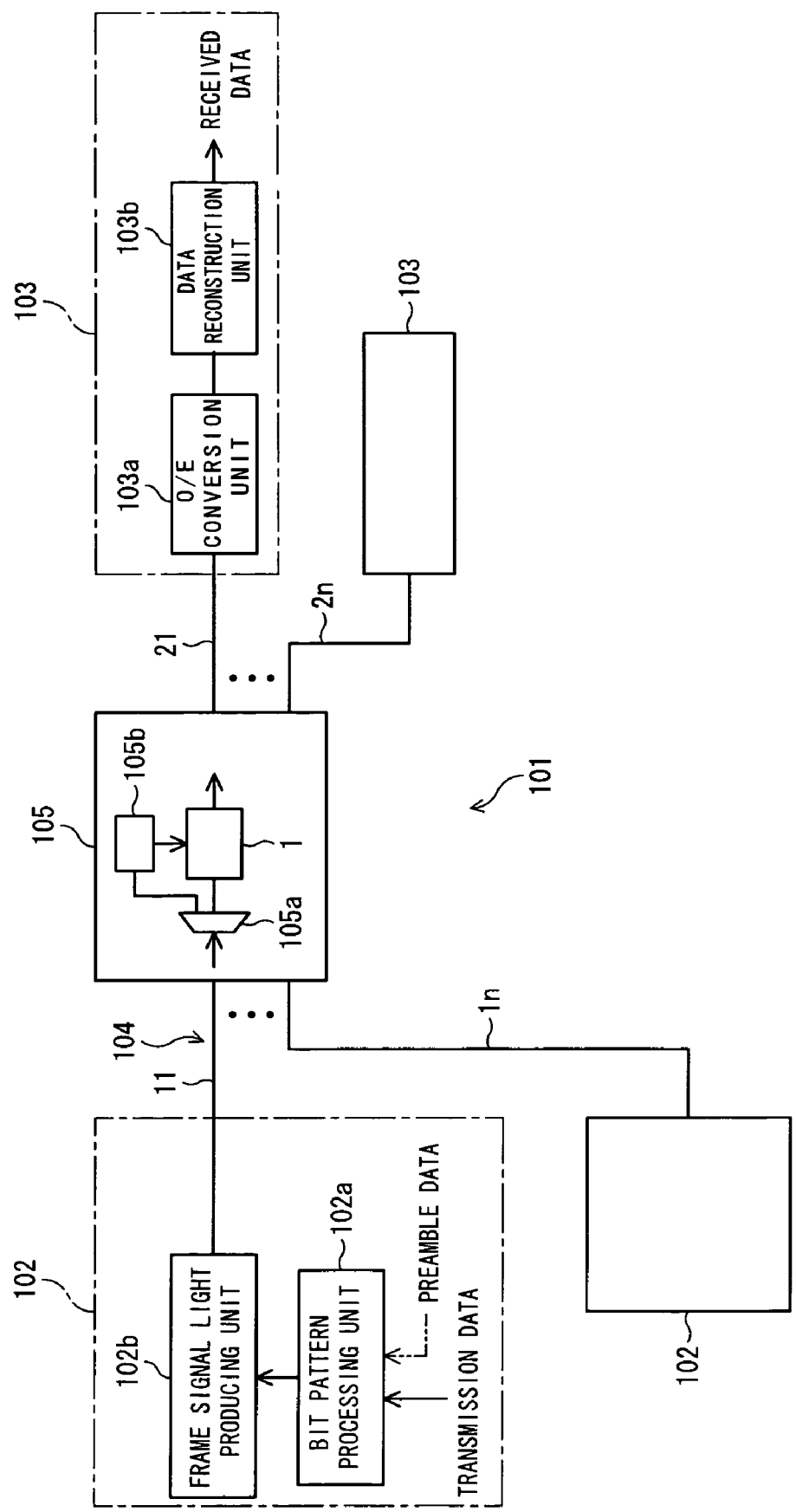
FIG. 1 is an illustration of an optical switching system according to a first embodiment of the present invention.

FIG. 1 is an illustration of an optical switching system according to a first embodiment of the present invention. In FIG. 1, an optical switching system 101 is made up of a transmission node 102 for transmitting frame signal light in which transmitted data is modulated, a reception node 103 for receiving the frame signal light from the transmission node 102 through a network 104, and an optical switching node 105 provided on the network 104 for setting a path, through which the frame signal light propagates, in a switching fashion.

In this case, frame signal light related to optical burst signal processing is used as the frame signal light to be transmitted/received between the aforesaid transmission node 102 and the aforesaid reception node 103, and the optical switching node 105 is designed to be capable of setting an optical route on the basis of route switching control information included in control signal light to be transmitted together with the aforesaid frame signal light.

The optical switching node 105 is connected through optical transmission lines 11 to 1n to a plurality of transmission nodes 102 and further connected through optical transmission lines 21 to 2n to a plurality of reception nodes 103. That is, the respective transmission nodes 102 are connected through the optical transmission lines 11 to 1n and through the use of individual input ports #11 to #1n, while the respective reception nodes 103 are connected through the optical transmission lines 21 to 2n and through the use of individual output ports #21 to #2n.

In addition, this optical switching node 105 is designed to be capable of setting optical routes between the transmission node 102 and the reception nodes 103 through the use of optical connections between input and output ports. Still additionally, as will be mentioned later, the optical switching node 105 has an adjusting function whereby the optical power (peak power) of the frame signal light outputted through each of the output ports becomes a target optical power and further has a function to monitor the frame signal light power at the time of the input to each of the input ports for the optical power adjustment at the target light power.

Moreover, for the optical route setting and variable attenuation control on the aforesaid frame signal light, the optical switching node 105 can include a separator 105a for separating frame signal light control information transmitted together with the frame signal light from the transmission node 102, a route setting fetching unit 105b for fetching information on the optical route to be set with respect to the frame signal light from the frame signal light control information separated by the separator 105a, and an optical switch apparatus 1 for switching the optical route of the inputted frame signal light in accordance with the optical route setting fetched by the route setting fetching unit 105b.

In this case, for the monitoring of the frame signal light power at the time of the input to each input port of the optical switching node 105, it is not preferable that the result of the power monitor depends upon the pattern of the transmitted data modulated into the frame signal light. That is, even in a case in which "0" data or "1" data are unevenly distributed in the pattern of the transmitted data, there is a need to monitor the inputted frame signal light power stably.

For this reason, the transmission node according to the first embodiment includes a pattern processing unit 102a for processing the bit pattern of the transmitted data as a configuration which is for monitor the power of the inputted signal light stably in the optical switching node 105 and a frame signal light producing unit 102b for producing frame signal light, which is to be transmitted, on the basis of the bit pattern processed by the bit pattern processing unit 102a.

Concretely, the bit pattern processing unit 102a is made to carry out a bit conversion on the bit pattern of the transmitted data so that the mark rate of the transmitted data becomes constant. For example, the bit conversion on the bit pattern of the transmitted data is conducted through the use of 8B10B conversion, 64B66B conversion or the like so that the mark rate becomes substantially constant at approximately 50%. Moreover, the frame signal light producing unit 102b produces frame signal light FSL on the basis of the data after this bit conversion and intermittently outputs it to the optical switching node 105.

Thus, the input monitor function unit of the optical switching node 105 monitors the optical power of the frame signal light with respect to the data after the above-mentioned bit conversion and the mark rate of the data modulated into the frame signal light is maintained to be substantially constant and, hence, the average power of the frame signal light can be monitored stably without depending upon the bit pattern of the transmitted data.

Figure 2:
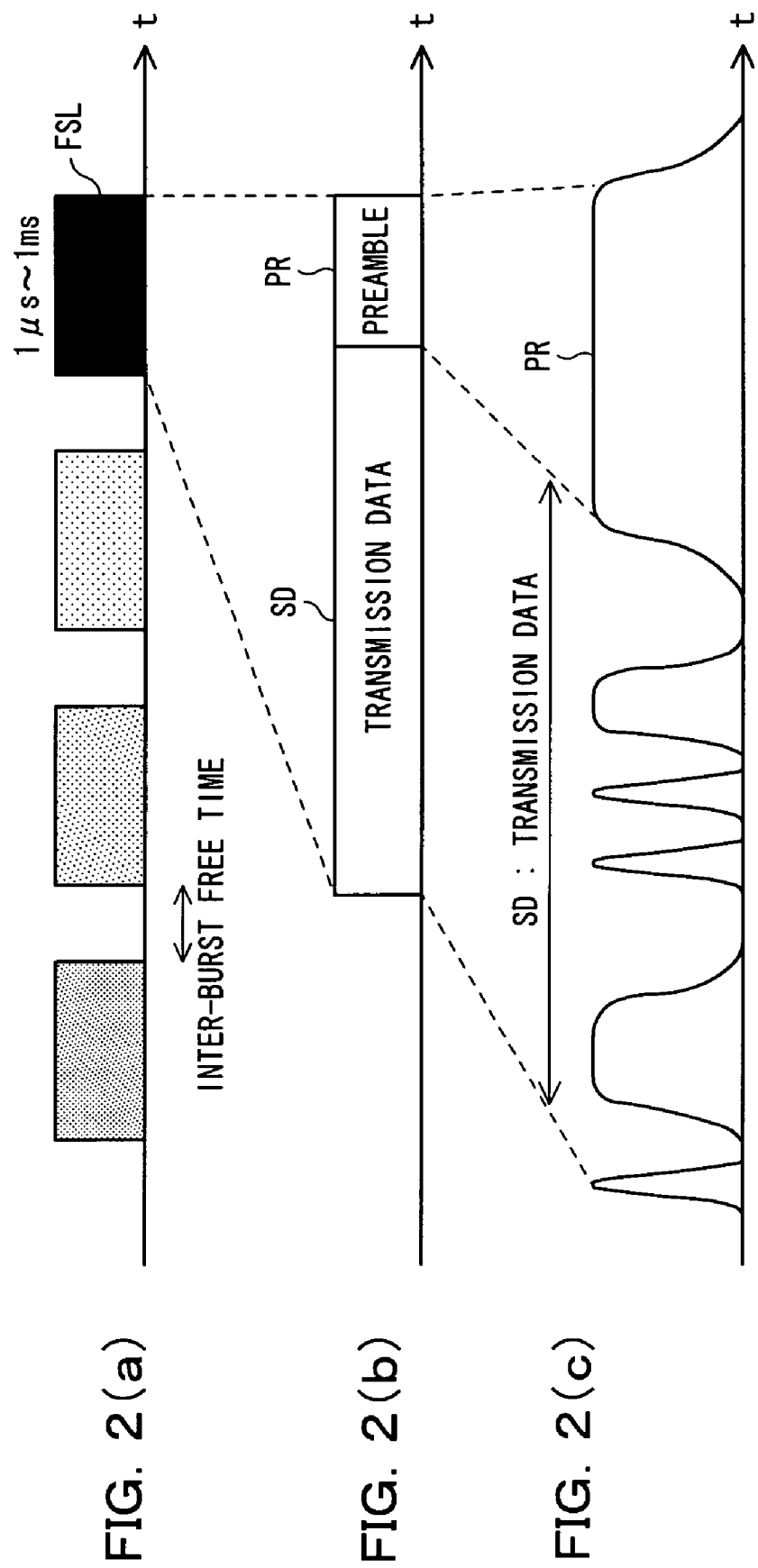
FIGS. 2(*a*) to 2(*c*) are illustrations useful for explaining frame signal light in the optical switching system according to the first embodiment of the present invention.

In addition to the above-mentioned bit conversion type modes, as the bit pattern processing unit 102a, as shown by (a) to (c) in FIG. 2, it is also possible to employ a mode in which a formalized bit pattern (for example, a pattern in which "1" continues) longer than a response time in the input monitor function unit (see reference numeral 62 in FIG. 3) of the optical switching node 105 is put, as a preamble PR, at the head or end of the bit pattern SD of the transmitted data. Then, the frame signal light producing unit 102b produces frame signal light FSL on the basis of the bit pattern in which the preamble PR is inserted into the transmitted data SD, and outputs it intermittently to the optical switching node 105.

The input monitor function unit of the optical switching node 105 monitors the preamble inserted into the transmitted data SD as mentioned above to obtain a monitor result, which does not depend on data pattern, with respect to frame signal light power from the transmission node 102. For example, in the transmission node 102, by monitoring the optical power of the portion in to which the "1" continuing pattern is inserted as the preamble PR, it is possible to detect the maximum power of the frame signal light from the transmission node 102.

Thus, since the bit pattern processing unit 102a can process the bit pattern of the transmitted data, it is possible to stabilize the optical power of the frame signal light to be monitored in the input monitor function unit (see reference numeral 62 in FIG. 3) of the optical switching node 105.

Moreover, the reception node 103, which receives the frame signal light from the transmission node 102 through the optical switching node 105, includes an (O/E (Optic/Electric) conversion unit 103a for converting frame signal light into an electric signal and a data reconstruction unit 103b for reconstructing, as received data, the transmitted data processed in the bit pattern processing unit 102a of the transmission node 102.

Figure 3:
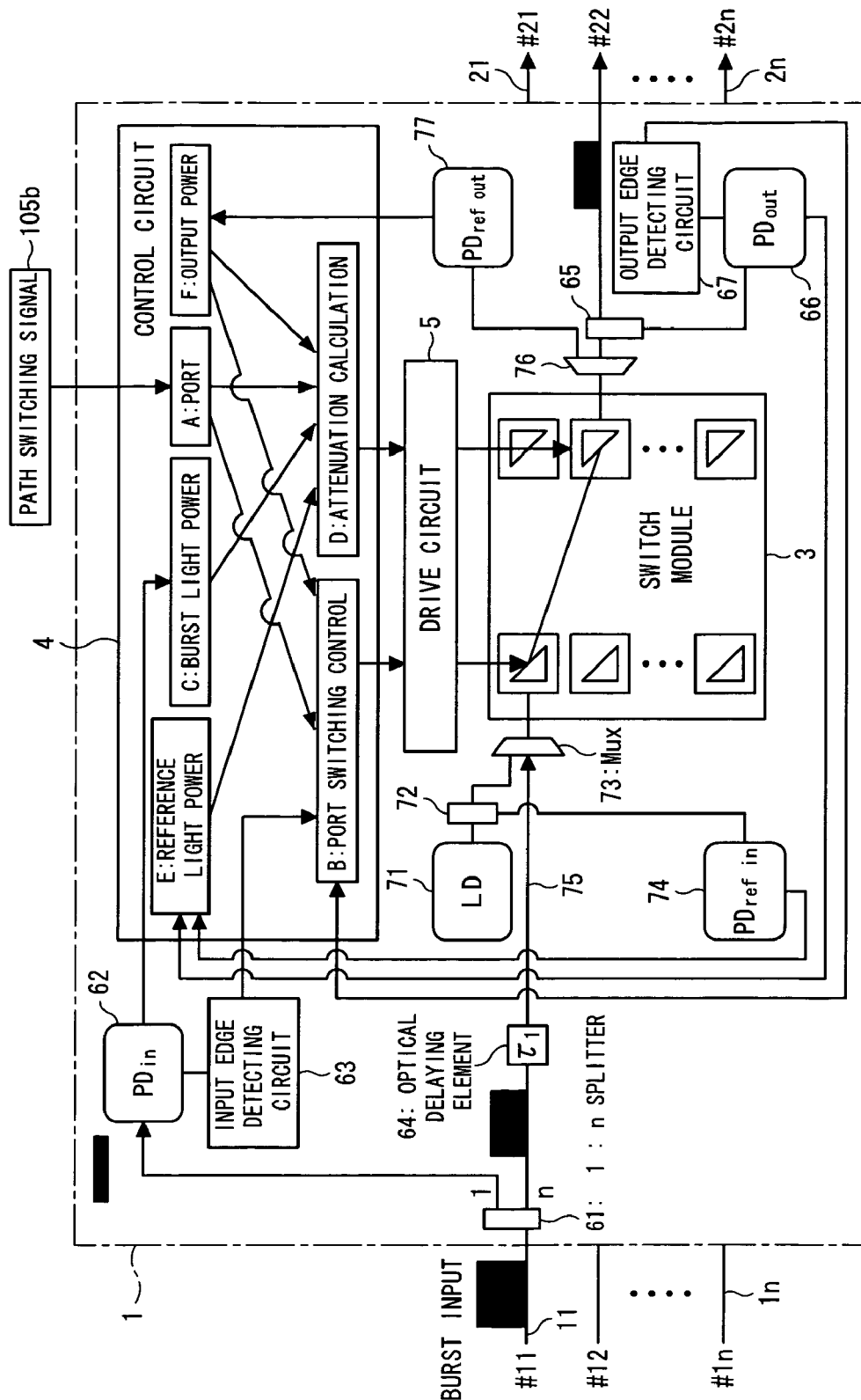
FIG. 3 shows an optical switch apparatus according to the first embodiment of the present invention.

[A-2] Configuration of Optical Switch Apparatus Constituting Optical Switching Node The optical switching node 105 can be equipped with an optical switch apparatus 1, for example, shown in FIG. 3. The optical switch apparatus 1 is designed to set an optical route by means of inter-input/output port optical connection between a plurality of input ports #11 to #1n and a plurality of output ports #21 to #2n and, as shown in FIG. 3, it is made up of a switch module 3, a control circuit 4 for controlling the supply of a drive voltage to the switch module 3, and a drive circuit 5.

In addition, as the components corresponding to each frame signal light to be inputted through the input ports #11 to #1n, the optical switch apparatus 1 includes a first branching unit 61, a first input power monitor 62, an input edge detecting circuit 63 and an optical delaying element 64 and, as the components corresponding to each frame signal light to be outputted through the output ports #21 to #2n, it includes a splitter 65, an output power monitor 66 and an output edge detecting circuit 67. Incidentally, for illustration, FIG. 3 shows the components corresponding to the frame signal light to be inputted/outputted through the input port #11 and the output port #22.

Still additionally, as the components for updating the control information stored in the above-mentioned control circuit 4, for each optical path from each input port #11 to #1n to the corresponding input terminal of the switch module 3, the optical switch apparatus 1 includes a reference light source 71, a splitter 72, a multiplexing unit 73 and a reference light input monitor 74 and, for each optical path from an output terminal of the switch module 3 to the corresponding output port #21 to #2n, it includes a wavelength demultiplexing unit 76 and a reference light output monitor 77. Incidentally, for illustration, FIG. 3 shows the components related to the optical paths communicating with the input port #11, the output port #22 and the input/output terminals of the switch module 3.

In this configuration, the first branching unit 61 is interposed between each input port #11 to #1n and each input terminal of the switch module 3 for carrying out a branch on a portion of the frame signal light from each input port #11 to #1n to the switch module 3. For example, it is composed of a 1:n splitter. That is, the first branching unit 61 carries out a branch on the frame signal light, inputted from the input port #11 to #1n, into branched light having a power component ratio of "1" and branched light having a power component ratio of "n" so as to output the branched light with the power component ratio "1" to the first input power monitor 62 and to output the branched light with the power component ratio "n" to the optical delaying element 64.

The first input power monitor 62 is composed of, for example, a photodiode and is made to monitor the branched light with the power component ratio "1" obtained by the first branching unit 61 with respect to the optical power of the frame signal light inputted through the corresponding input port #11 to #1n and is made to output the monitor result to the input edge detecting circuit 63 and further to the control circuit 4. At this time, since the frame signal light outputted from the transmission node 102 is produced from the data bit-pattern-processed by the bit pattern processing unit 102b, the first input power monitor 62 can conduct the monitoring stably.

The input edge detecting circuit 63 is for detecting an input edge of the frame signal light on the basis of the monitor result from the first input power monitor 62. Moreover, the control circuit 4, mentioned later, starts the control on the supply of the drive voltage to the switch module 3 when the input edge detecting circuit 63 detects the input edge.

That is, when the aforesaid input edge is detected by the input edge detecting circuit 63, the control circuit 4 uses it as a trigger to execute the optical route setting control on the frame signal light and further to execute the control for the variable attenuation control with respect to this frame signal light on the basis of the optical power of the frame signal light monitored by the first input power monitor 62. That is, as a drive voltage to the switch module 3, the control circuit 4 calculates a drive voltage for the route switching and the attainment of a target output power in the switch module 3 with respect to the frame signal light optical-power-monitored by the first input power monitor 62.

In this connection, although in the optical switch apparatus 1 according to the first embodiment the control circuit 4 starts the control operation in a manner such that the input edge detection by the input edge detecting circuit 63 is used as a trigger, in addition to this, it is also appropriate that trigger information for starting the control on the supply of the drive voltage to the switch module 3 is received through frame signal light control information transmitted together with the frame signal light.

The optical delaying element (first delaying unit) 64 is for delaying, by time τ1, the timing that the frame signal light forming the branched light with the power component ratio "n" from the first branching unit 61 is inputted to the input terminal of the switch module 3. This enables a delay of the input of the frame signal light to the switch module 3 to be made until the drive voltage supply control by the control circuit 4 and the drive circuit 5 reaches a stable condition. The setting of this time τ1 by the optical delaying element 64 will be mentioned later.

Under the drive voltage supply control by the control circuit 4 and the drive circuit 5 which will be mentioned later, the switch module 3 deflects the frame signal light from each input port #11 to #1n, inputted through the corresponding first branching unit 61 and optical delaying element 64, thus outputting it from an output terminal communicating with the output port #21 to #2n constituting a set optical route and setting the optical power of the frame signal light, to be outputted, at a target power.

Figure 4:
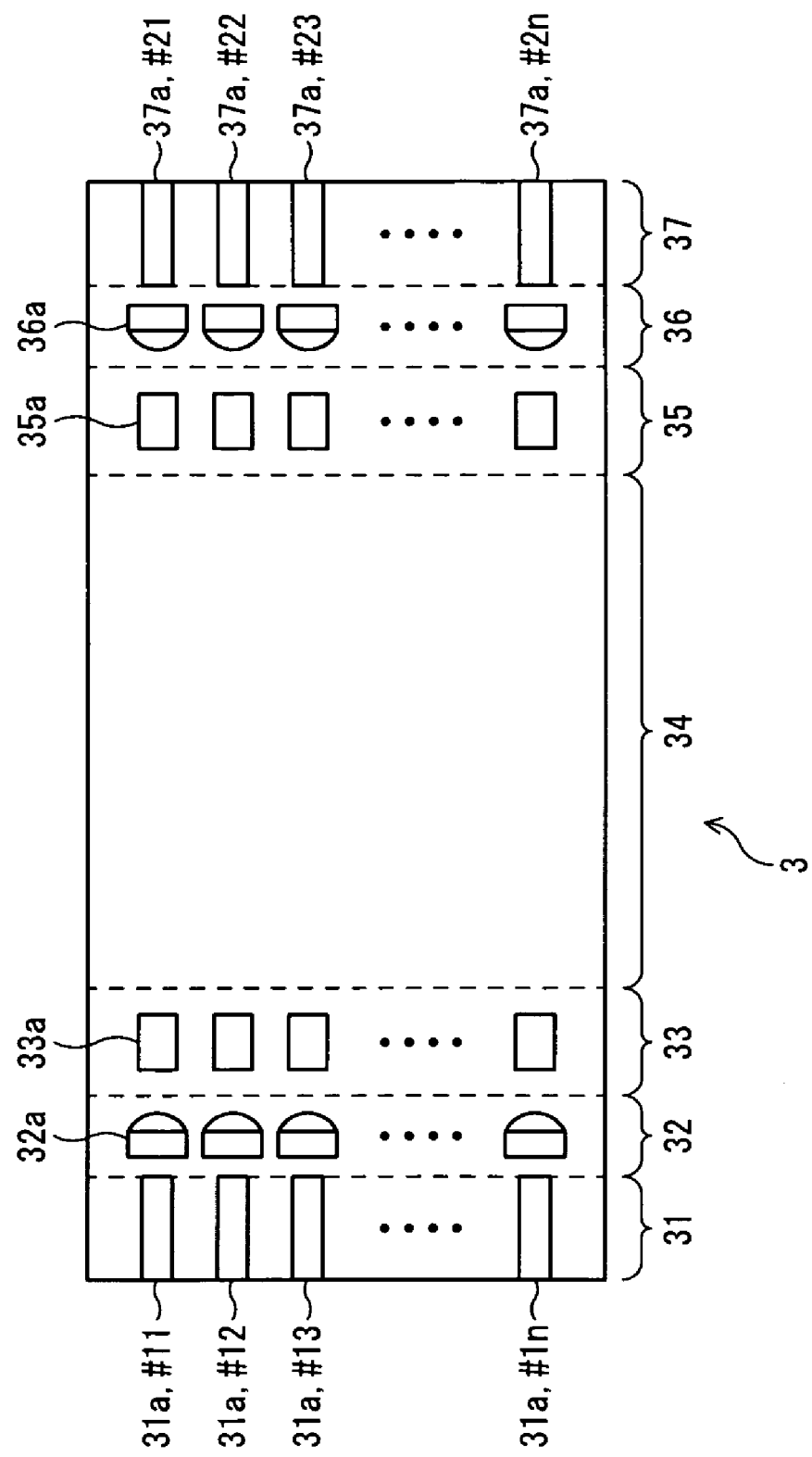
FIGS. 4 and 5 show a switch module according to the first embodiment of the present invention.

In this case, the switch module 3 is a voltage-applied type deflection optical switch using, for example, PLZT [(Pb, La)(Zr, Ti) O3] forming a ferroelectric substance and, for example, as shown in FIG. 4, a switch module similar to the module described in the patent document 1 is employable.

The switch module shown in FIG. 4 is made up of an incidence side optical waveguide unit 31, a collimating unit 32, an incidence side optical deflection element unit 33, a common optical waveguide unit 34, an outgoing side optical deflection element unit 35, a collecting (condensing) unit 36 and an outgoing side optical waveguide unit 37.

Each of the incidence side and outgoing side optical waveguide units 31 and 37 has, as a core, a plurality of optical waveguides 31a, 37a forming input terminals and output terminals corresponding to the input ports #11 to #1n and the output ports #21 to #2n, and each of the incidence side and outgoing side optical deflection element units 33 and 35 has n optical deflection elements 33a, 35a capable of deflecting input light by applying a drive voltage through an electrode. This enables the optical deflection element 33a, 35a to carry out the route switching with respect to the signal light inputted through the optical waveguide unit 31a for outputting through a desired optical waveguide unit 37a. In the illustration, reference numeral 32a represents a collimator lens and reference numeral 36a designates a collective lens.

Furthermore, in this embodiment, the incidence side optical deflection element unit 33 constitutes a tracking optical deflection element unit for making a connection to an optical route communicating with the switching-accepting side output ports #21 to #2n under the drive voltage supply control by the control circuit 4 and the drive circuit 5 which will be mentioned later. The outgoing side optical deflection element unit 35 constitutes a variable attenuation optical deflection element unit which carries out variable attenuation under the drive voltage supply control by the control circuit 4 and the drive circuit 5 so that the frame signal light to be outputted through the output ports #21 to #2n becomes a target optical power.

That is, the optical coupling state to the outgoing side optical waveguide unit 37 communicating with the output ports #21 to #2n is controlled in accordance with the deflection state of the signal light from the incidence side optical deflection element unit 33, thereby implementing the variable attenuation control on the frame signal light outputted through the output ports #21 to #2n.

Figure 5:
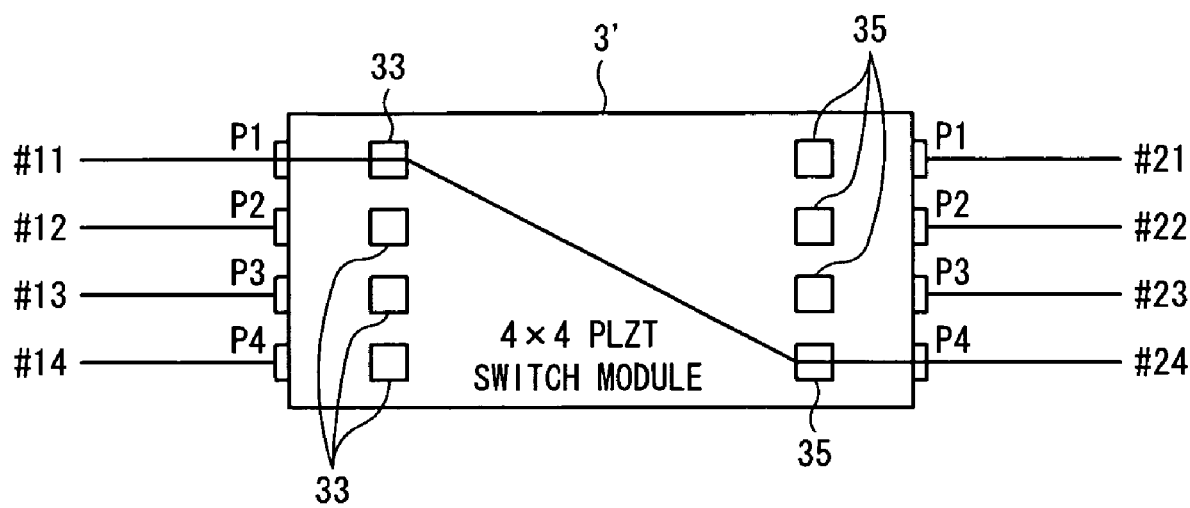
Figure 6:
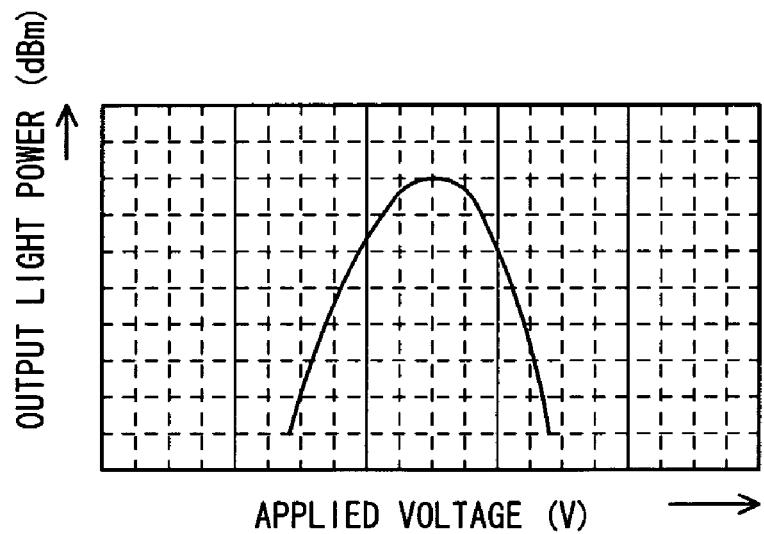
FIG. 6 is an illustration useful for explaining a variable attenuation characteristic of the switch module according to the first embodiment of the present invention.

For example, in the case of the construction of a switch module 3' having 4×4 as the number of input terminals× number of output terminals as shown in FIG. 5, when frame signal light from an input terminal P1 communicating with an input port #11 is led to an output terminal P4 communicating with an output port #24, if the drive voltage to be applied to the outgoing side optical deflection element unit 35 corresponding to the output terminal P4 is varied as shown in FIG. 6, then it is possible to change the output power into parabola configuration.

As mentioned above, the control circuit 4 is made to calculate, as a drive voltage to the switch module 3, a drive voltage for the route switching and the setting of a target output power with respect to the frame signal light. Incidentally, it is also possible that route switching setting information for the frame signal light is received through frame signal light control information transmitted together with the frame signal light. Moreover, target signal light output power level information can be received through the aforesaid frame signal light control information, or it can also be stored in the control circuit 4 in advance.

The drive circuit 5 receives, as control information, the drive voltage information obtained by the calculation in the control circuit 4 and supplies a drive voltage corresponding to the received drive voltage information to the incidence side and outgoing side optical deflection element units 33 and 35 constituting the switch module 3.

Thus, the aforesaid control circuit 4 and drive circuit 5 constitute a drive voltage supply control unit designed to carry out the control on the drive voltage supply to the switch module 3 on the basis of the frame signal light monitor result from the each of the first input power monitors 62 for controlling the optical route with respect to the frame signal light.

Figure 7:
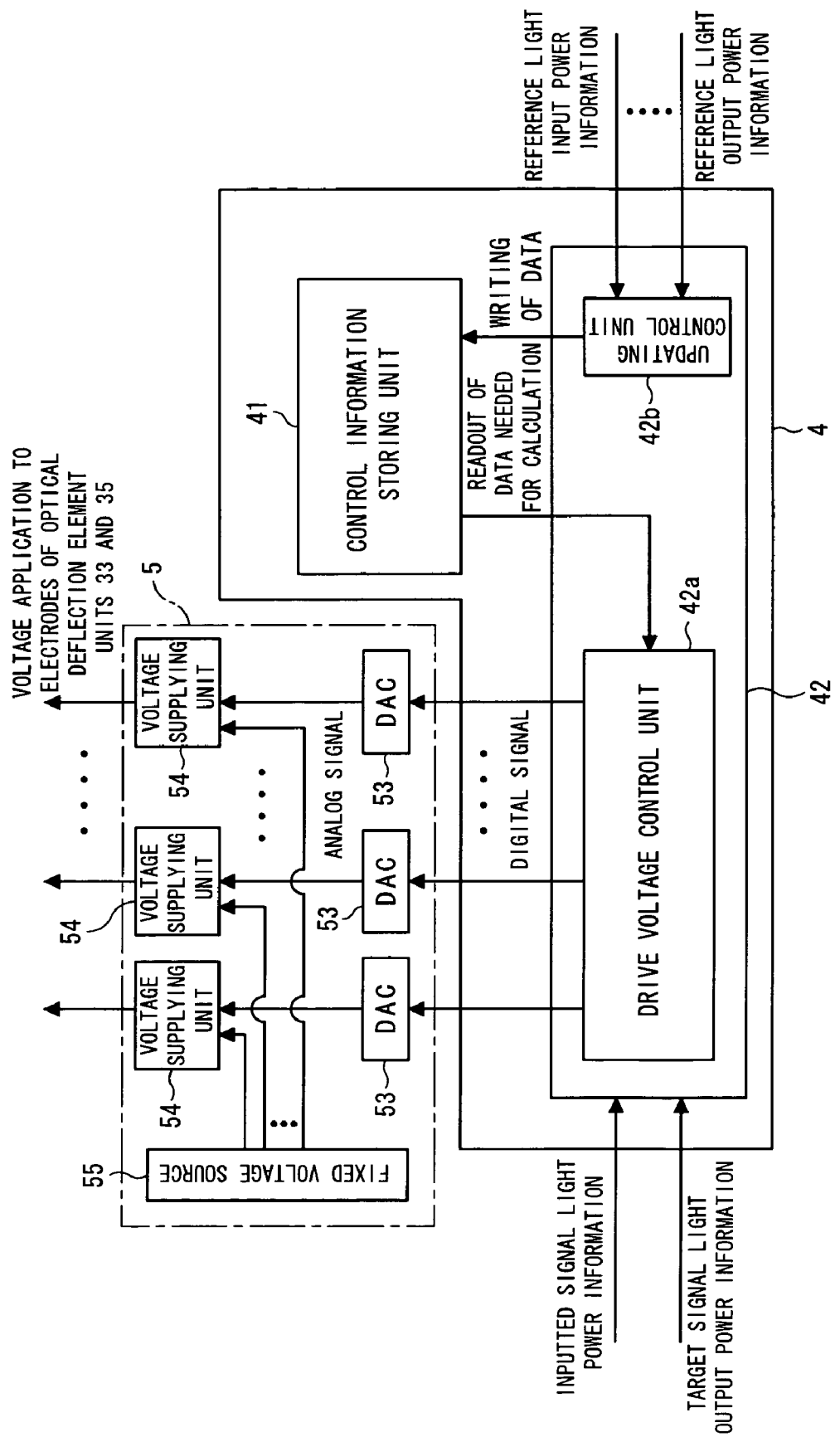
FIG. 7 shows a control circuit and a drive circuit according to the first embodiment of the present invention.

The control circuit 4 and the drive circuit 5 are configured, for example, as shown in FIG. 7. As FIG. 7 shows, the control circuit 4 is made up of a control information storing unit 41 for storing control information for setting optical routes through which frame signal light propagate between the plurality of input ports #11 to #1*n* and the plurality of output ports #21 to #2*n*, and a processing unit 42 for carrying out the control on the switch module 3 through the use of the contents stored in the aforesaid control information storing unit 41. The processing unit 42 can be constructed by, for example, a CPU, and the processing unit 42, together with the aforesaid control information storing unit 41, can also be constructed by an FPGA (Field Programmable Gate Array).

In this case, the control information storing unit 41 is for storing drive voltage information (drive voltage information for port switching) to be supplied to the incidence side and outgoing side optical deflection element units 33 and 35 in accordance with an optical route to be set and further for storing drive voltage information corresponding to a variable attenuation controlled variably with respect to the frame signal light passing through the set optical route.

Moreover, the processing unit 42 includes a drive voltage control unit 42*a* and an updating control unit 42*b*. The drive voltage control unit 42*a* makes reference to the contents of the control information storing unit 41 on the basis of a result of the monitor by the first input power monitor 62 to output a control signal for controlling the drive voltage to be supplied to the incidence side and outgoing side optical deflection element units 33 and 35 constituting that optical route, thereby controlling the optical route for the frame signal light and the output power of the frame signal light to be outputted from the output ports #21 to #2*n*.

The drive voltage control unit 42*a* is made to output, as a control signal with a digital value, the drive voltage information forming the control signal outputted as mentioned above to a digital/analog converter 53 communicating with the corresponding optical deflection element units 33 and 35. The concrete processing modes on the route switching and variable attenuation function by the drive voltage control unit 42*a* will be described later.

Moreover, the updating control unit 51*b* is for carrying out the updating control on the control information related to an optical route forming an object of updating in the control information storing unit 41 on the basis of a result of the monitor from a reference light output power monitor 77. The updating mode for the control information by the updating control unit 51*b* will be described later.

Still moreover, the drive circuit 5 receives the control signal from the drive voltage control unit 42 and supplies a drive signal to the incidence side optical deflection element unit 33 and the outgoing side optical deflection element unit 35 disposed at the positions corresponding to the input/output ports #11 to #1*n* and #21 to #2*n* for setting the optical route, and it is composed of a digital/analog converter 53, a voltage supplying unit 54 and a fixed voltage source 55.

The digital/analog converter 53 is for converting the control signal outputted as mentioned above for the incidence side and outgoing side optical deflection element units 33 and 35 from a digital value into an analog value, and this control signal with the analog value is outputted to the voltage supply unit 54 communicating with the corresponding optical deflection element units 33 and 35.

In addition, the drive voltage supplying unit 54 is for supplying a drive voltage, controlled by the control signal from the drive voltage control unit 42, to the optical deflection element units 33 and 35. Concretely, the drive voltage supplying unit 54 receives the control signal as a control signal with an analog value from the drive voltage control unit 42 through the digital/analog converter 53 and carries out a voltage conversion with respect to a voltage signal from the fixed voltage source 55 to obtain a voltage signal according to the drive voltage information outputted from the drive voltage control unit 42, thus supplying the obtained drive voltage signal to the corresponding optical deflection element units 33 and 35.

For example, in a case in which an optical route is set between the input port #11 and the output port #24, a drive voltage is supplied to the incidence side optical deflection element unit 33 disposed at the position corresponding to the input port #11 and the outgoing side optical deflection element unit 35 disposed at the position corresponding to the output port #24 so that the frame signal light inputted from the input port #11 can be deflected to be outputted through the output port #24 in a state controlled to a target output power.

Still additionally, the output power monitor 66 shown in FIG. 3 is for monitoring the optical power of the frame signal light led from the output terminals of the switch module 3 to the output ports #21 to #2*n* through the use of branched light split by the splitter 65, and the output edge detecting circuit 67 is for detecting the output edge of the frame signal light to be outputted from the output terminals of the switch module 3 to the output ports on the basis of the monitor result from the output power monitor 66 and constitutes a passage detecting unit for detecting the passage of the frame signal light to the output ports.

Yet additionally, when the output edge detecting circuit 67 detects the passage of the frame signal light, the aforesaid control circuit 4 is made to be capable of resetting the drive voltage supply control on the switch module 3 for this frame signal light.

Moreover, according to a result of the monitor of the output power by the output power monitor 66, the control unit 4 can carry out the feedback control so as to correct a difference or departure occurring between the output power of the frame signal light led to the output ports #21 to #2*n* and a target output power of the frame signal light to be outputted from the out ports #21 to #2*n*. That is, in a case in which the succeeding frame signal light to the same optical route is inputted thereto, the difference is taken as a feedback factor so that the drive voltage information to be outputted from the control circuit 4 to the drive circuit 5 reflects it.

Still moreover, in a configuration for updating the control information stored in the control information storing unit 41, the reference light source 71 is made to output reference light having, for example, a wavelength other than the wavelength band of the frame signal light, and the splitter 72 is made to carry out a partial branch for monitoring the power of the reference light from the reference light source 71 by the reference light input monitor 74. The reference light input monitor 74 is made to monitor the optical power of the reference light inputted to the input terminals of the switch module 3 through the use of the optical power of the branched light from the splitter 72, with the monitor result being outputted to the control circuit 4.

Although in the optical switch apparatus according to the first embodiment the reference light input monitor 74 is provided for investigating the input power of the reference light in the control circuit 4, if the input power of the reference light is stored in the control circuit 4 in advance, then the splitter 72 and the reference light input monitor 74 are omissible.

The multiplexing unit 73 receives the reference light from the reference light source 71 through the splitter 72 to multiplex it with respect to a frame signal light line 75 extending from the input port #11 to #1n to an input terminal of the switch module 3. In this case, since the frame signal light and the reference light differ in wavelength band from each other, the reference light is inputted to the input terminal of the switch module 3 by means of the wavelength multiplexing. Accordingly, the reference light also undergoes the route switching in the switch module 3 and is then outputted through one output terminal.

Therefore, the reference light source 71 and the multiplexing unit 73, mentioned above, constitute a reference light outputting unit for outputting reference light to input terminals forming an optical route being an object of updating in the switch module 3.

Moreover, the wavelength demultiplexing unit 76 is for carrying out the wavelength demultiplexing on the reference light after undergoing the route switching in the switch module 3, with the frame signal light component being outputted through the splitter 65 to the corresponding output port #21 to #2n and the reference light being outputted to the reference light output monitor 77.

Still moreover, the reference light output monitor 77 is for monitoring the optical power of the reference light component from the wavelength demultiplexing unit 76, with the monitor result being outputted to the control circuit 4 for the purpose of updating the contents stored in the control information storing unit 41. Therefore, this reference light output monitor 77 constitutes a reference light monitor unit for monitoring the characteristic of the output power from an output terminal forming an optical route being an object of updating in the switch module 3.

Yet moreover, the updating control unit 42b of the processing unit 42 constituting the control circuit 4 carries out the updating control on the control information such as the drive voltage information with respect to the optical deflection element units 33 and 35 related to the optical route being an object of updating in the control information storing unit 41.

Therefore, the reference light source 71, the wavelength multiplexing unit 73, the wavelength demultiplexing unit 76, the reference light output monitor 77 and the updating control unit 42b constitute an updating unit which makes the reference light pass through the optical route set by supplying the drive voltage based on the control information being an object of updating in the control information storing unit 41 to the switch module 3 and which updates the contents of the control information being the object of updating in the control information storing unit 41 on the basis of the characteristics of the input and output power of the reference light passing through the optical route.

[A-3] Mode of Route Switching and Variable Attenuation Control by Optical Switch Apparatus 1

Figure 8:
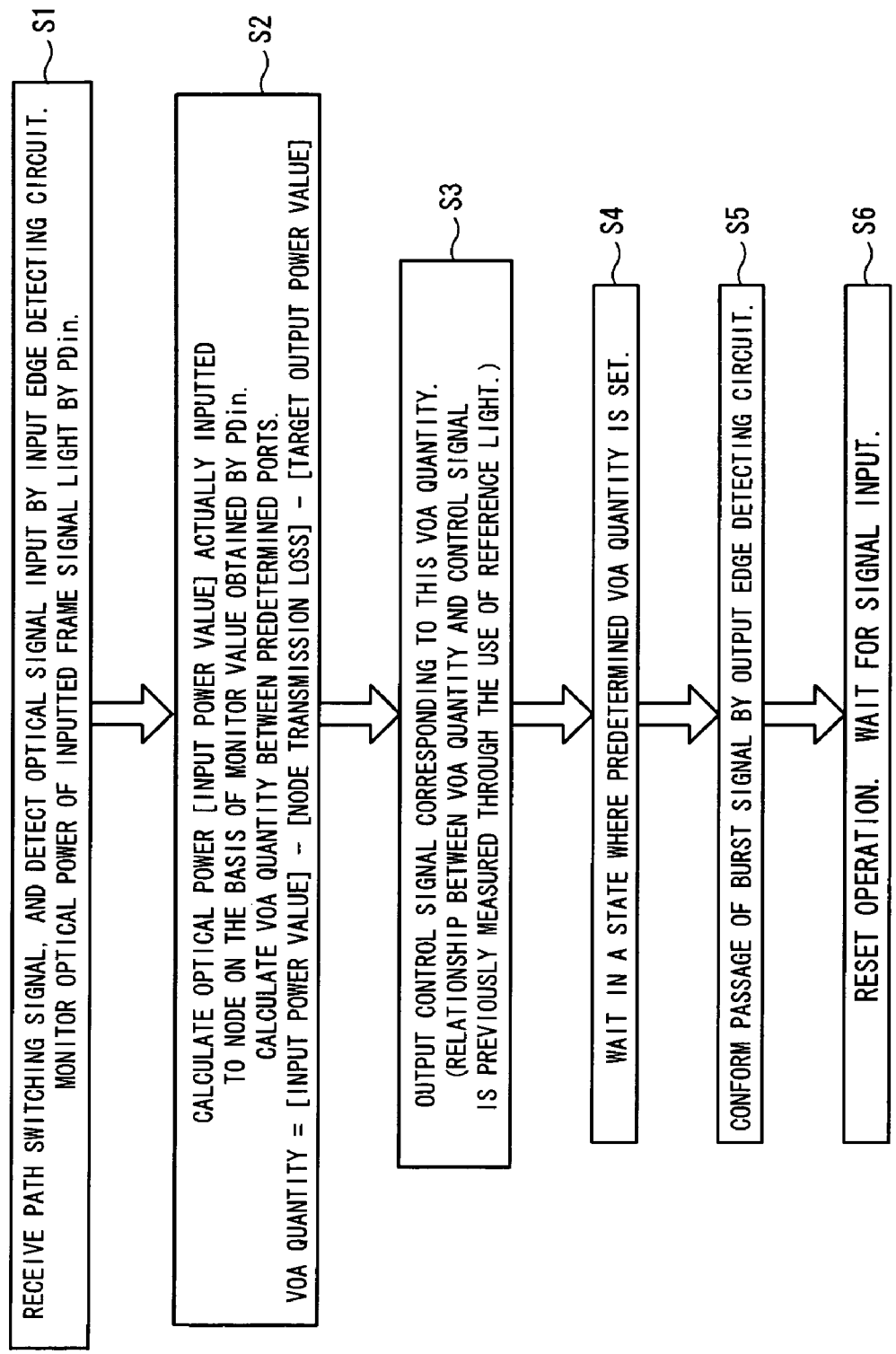
FIG. 8 is a flow chart useful for explaining variable attenuation control in the optical switch apparatus according to the first embodiment of the present invention.

In the optical switching system 101 configured as described above, the transmission node 102 transmits frame signal light intermittently in a state spaced by a free time Tspace. As shown by a flow chart in FIG. 8, the optical switch apparatus 1 constituting the optical switching node 105 executes the control to set the optical power at the time of the output from the output ports #21 to #2n to a target power while switching the optical route for each frame signal light [burst signal, see FIG. 3 and (a) in FIG. 9] transmitted intermittently.

That is, the control circuit 4 of the optical switch apparatus 1 receives, as a path switching signal, the information, related to an optical route to be set with respect to the frame signal light, fetched from the frame signal light control information transmitted together with the frame signal light by the route setting fetching unit 105b. The information on the optical route included in this path switching signal includes at least a combination of the input ports #11 to #1n and the output ports #21 to #2n to be connected (see A in FIG. 3).

In addition to the aforesaid path switching signal, in response to the detection of an input edge (input edge of the frame signal light related to the path switching signal) from the input edge detecting circuit 63, the drive voltage control unit 42a of the control circuit 4 uses this detection as a trigger to fetch the drive voltage information according to the path switching signal from the control information storing unit 41 (see B in FIG. 3) and receives the monitor result of the optical power of the frame signal light monitored by the first input power monitor (P Din) 62 (step S1, see C in FIG. 3) to calculate a variable attenuation quantity for obtaining a target output power (see D in FIG. 3).

At this time, the first input power monitor 62 monitors the entire frame signal light as average power in a case in which the data pattern is processed so that the frame signal light outputted from the transmission node 102 has a constant mark rate while monitoring the optical power of a portion related to a preamble PR as the maximum power in a case in which the preamble PR is inserted into the transmitted data SD.

In the case of outputting, to the control circuit 4, the monitor result of the optical power of the frame signal light inputted to the optical switch apparatus 1, a lag (difference) of the output timing occurs by a response time in the first input power monitor 62 with respect to the input timing [see FIG. 3 and (b) in FIG. 9].

For calculating the aforesaid variable attenuation quantity for the target output power, the drive voltage control unit 42a calculates the input power of the frame signal light actually inputted to the optical switching node 105 on the basis of the monitor result by the first input power monitor 62. At this time, the calculation for the input power of this frame signal light is made according to whether the monitor result shows the average power or the maximum power.

In addition, the drive voltage control unit 42a calculates a quantity (VOA quantity) to be variably attenuated in the switch module 3 by subtracting a node transmission loss and a target output power value from the input power [input power value] of the aforesaid actual frame signal light as shown by the following equation (1) (step S2). The aforesaid node transmission loss signifies a loss quantity when the frame signal light passes through the optical switch module 105 in a case in which an optical route is set by supplying a drive voltage corresponding to the drive voltage information for the port switching stored in the control information storing unit 41.

$$\text{VOA quantity} = [\text{input power value}] - [\text{node transmission loss}] - [\text{target output power value}] \quad (1)$$

When calculating the VOA quantity as mentioned above, the drive voltage control unit 42a makes reference to the drive voltage information for the variable attenuation control stored in the control information storing unit 41 to acquire the drive voltage information for setting the optical route and for setting the power of the frame signal light to the output port at the target output power. Moreover, the drive voltage control unit 42a outputs the acquired drive voltage information as a control signal to the drive circuit 5 (step S3).

The drive circuit 5 supplies the drive voltage according to the control signal from the drive voltage control unit 42a to the corresponding optical deflection element units 33 and 35. Thus, the preparation for the route switching and the variable attenuation when the frame signal light [see FIG. 3 and (c) in FIG. 9] delayed by the optical delaying element 64 is inputted to the switch module 3 reaches completion, and a stand-by state is taken for the input of this frame signal light (step S4).

Following this, when the frame signal light [see FIG. 3 and (c) in FIG. 9] delayed by the optical delaying element 64 is inputted to the switch module 3, since the corresponding optical deflection element units 33 and 35 of the switch module 3 are drive-controlled, this frame signal light is deflected to be outputted at the target output power through the output port forming the set optical route [see FIG. 3 and (d) in FIG. 9].

In the control information storing unit 41, the incidence side and outgoing side optical deflection element units 33 and 35 are made to set an optical route in cooperation with each other and, hence, there is a need to store the optical route setting drive voltage information for both the optical deflection element units 33 and 35 for each optical route. On the other hand, the variation attenuation control on the output frame signal light is adjustable by the deflection angle of the outgoing optical deflection element unit 35, thus permitting the drive voltage information for the outgoing side optical deflection element unit 35 to be stored in a state associated with the attenuation quantity.

In addition, the updating control unit 42b can previously store the relationship between the attenuation quantity of the output frame signal light and the drive voltage in the outgoing side optical deflection element unit 35 in the form of a table in the control information storing unit 41 on the basis of the relationship between the monitor result (see E in FIG. 3) of the input/output power of the reference light and the drive voltage.

Still additionally, when output edge detecting circuit 67 detects the passage of the frame signal light (step S5) the transmission of the frame signal light through the optical route under the drive voltage control reaches completion and, hence, this fact is notified to the drive voltage control unit 42a for resetting the drive voltage control. The drive voltage control unit 42a resets the drive voltage control for the optical deflection element units 33 and 35 corresponding to the optical route through which this frame signal light has passed and shifts to a waiting state for the input of the succeeding frame signal light (step S6).

When the output power monitor result by the output power monitor 66 shows a difference occurring between the output power of the frame signal light led to that output port and the target output power of the frame signal light to be outputted from the output port, the drive voltage control unit 42a of the control circuit 4 takes this difference as a feedback factor (see F in FIG. 3) so as to carry out the feedback control with respect to the succeeding frame signal light for correcting the difference.

[A-4] About Setting of Delay Time τ1 by Optical Delaying Element, Interval of Frame Signal Light Intermittently Transmitted and Frame Length of Frame Signal Light In the above-described optical switching system 101 according to the first embodiment, the following operation conditions are given to the setting of a delay time τ1 by the optical delaying element, the interval of the frame signal light intermittently transmitted and the frame length of the frame signal light.

In this case, as shown in FIG. 10, let it be assumed that the data time of the frame signal light (burst signal light) is taken to be Tdata, the time (response time) needed for monitoring the optical power in the first input power monitor 62 is taken as Tmon and the sum of Tdata and Tmon is taken as burst signal length Tbar. Moreover, the interval of the frame signal light is taken as Tspace.

In a case in which the control circuit 4 has a processing capability to carry out the optical route setting control and the optical attenuation control on the burst signal light with respect to only the frame signal light one by one, Tspace+Tbar corresponding to the cycle of the burst signal is required to be longer than the delay time τ1 established by the optical delaying element 64. This is for preventing the succeeding burst signal light from being inputted before the switching for the preceding burst signal light by the switch module 3 comes to an end.

Moreover, from which the burst signal light is inputted to the optical switching node 105 until the switching operation reaches completion, as shown in FIG. 11, as the items of the processing, there are required the communication time Tcom for the port connection information, the processing time Tcal for the calculation of the VOA quantity and others in the control circuit 4, the drive time Tdrv for the drive circuit and the response time Tres to the drive voltage supply to the optical deflection element units 33 and 35.

Still moreover, the delay time τ1 produced by the optical delaying element 64 is required to be longer than the time needed from when the aforesaid burst signal light is inputted to the optical switching node 105 until the switching operation reaches completion. This is because there is a need for the burst signal light to be inputted to the switch module 3 after the setting of the switch module 3 reaches completion.

Accordingly, there is a need for the delay time τ1 by the optical delaying element 64 to satisfy the condition indicated by the following equation (2). In the equation (2), as indicated by the equation (3), τ min denotes the sum total of times of items needed from when the aforesaid burst signal light is inputted to the optical switching node 105 until the switching operation reaches completion.

$$\text{Tspace} + \text{Tbar} \geq \tau1 \geq \tau\min \tag{2}$$

$$\tau\min = \text{Tcal} + \text{Tres} + \text{Tdrv} + \text{Tcom} \tag{3}$$

With respect to the condition indicated by the equation (2), when τ1 is sufficiently long, if the optical monitor processing (see reference numeral 62) to be conducted at the arrival at the head portion of the burst signal light and the switching processing (see reference numeral 3) to be conducted after the burst signal light passes through the optical delaying element 64 can be individually carried out without making a connection with each other (parallel processing), the node can switch the burst signal light, and the condition (Tspace+Tbar≧τ1) on the upper limit is canceled.

For example, in a case in which the optical delaying element 64 carries out a delay by a sufficiently long time so that 10 burst signal lights can be accumulated, if an operation such as FIFO (First In First Out) can be conducted such that the first power monitor 62 can monitor the 10 burst signal lights continuously and, following this, the control circuit 4 and the drive circuit 5 can switch the 10 burst signal light in succession, then it is possible to process the burst signals.

In this case, the processing is conducted in the order of the optical power of the first burst signal being monitored, the optical power of the second burst signal being monitored, . . . , the optical power of the Nth burst signal being monitored, and the first burst signal being switched, the second burst signal being switched after the passage of the first burst signal, . . . , the Nth burst signal being switched after the passage of the N−1th burst signal.

Furthermore, the upper limit Tlimit depending upon the node configuration is taken as the value of Tspace. That is, in the case of exceeding the upper limit Tlimit, difficulty is encountered in distinguishing between the interval of the intermittence of the burst signal light and the optical signal cutoff state, which exerts influence on the response of an optical device such as an optical amplifier or which causes the degradation of transmission characteristics. Moreover, since the switching operation is conducted in the time of Tspace, the Tspace value requires a time longer than the sum of the drive time drv for the drive circuit 5 and the response time Tres to the drive voltage supply to the optical deflection element units 33 and 35.

From the above, as the value of Tspace, there is a need to satisfy the condition indicated by the following equation (4).

$$\text{Tres} + \text{Tdrv} \leq \text{Tspace} < \text{Tlimit} \tag{4}$$

In addition, since there is a need for the first input power monitor 62 to monitor the power of the frame signal light during Tbar, it is required to satisfy the condition indicated by the following equation (5).

$$\text{Tbar} \geq \text{Tmon} \tag{5}$$

Putting the above-mentioned equations (2) to (5) together, as shown in FIG. 12, the optical switching system 101 according to the first embodiment is on the assumption of the conditions 1 and 2 on the delay time τ1 by the optical delaying element 64, the condition 3 on the interval Tspace of the burst signal light and the condition 4 on Tbar.

[A-5] Effects

In the optical switching system 101 configured as described above, frame signal light can be transmitted/received between the transmission node 102 and the reception node 103. At this time, through the use of the optical route setting control and the variable attenuation control for a target optical power by the control circuit 4 and the drive circuit 5, it is possible to supply a drive voltage for the optical route setting control and the variable attenuation control to the corresponding optical deflection element units 33 and 35 in a response time of approximately several μs from the time of the input of the signal light.

Therefore, in the optical switch apparatus 1 premised on the above-mentioned conditions 1 to 4 shown in FIG. 12, the switch module 3 can carry out the route switching with respect to the inputted frame signal light and can set the optical power of the frame signal light, outputted from each output port, at a target power.

As described above, the first embodiment of the present invention can provide an advantage of continuously carrying out the route switching with respect to the frame signal light inputted through various paths while eliminating differences in output power value.

In addition, it can provide an advantage of eliminating the fluctuation of optical power by a response in a time dimension shorter than milli-seconds.

[B] Description of Second Embodiment

Figure 13:
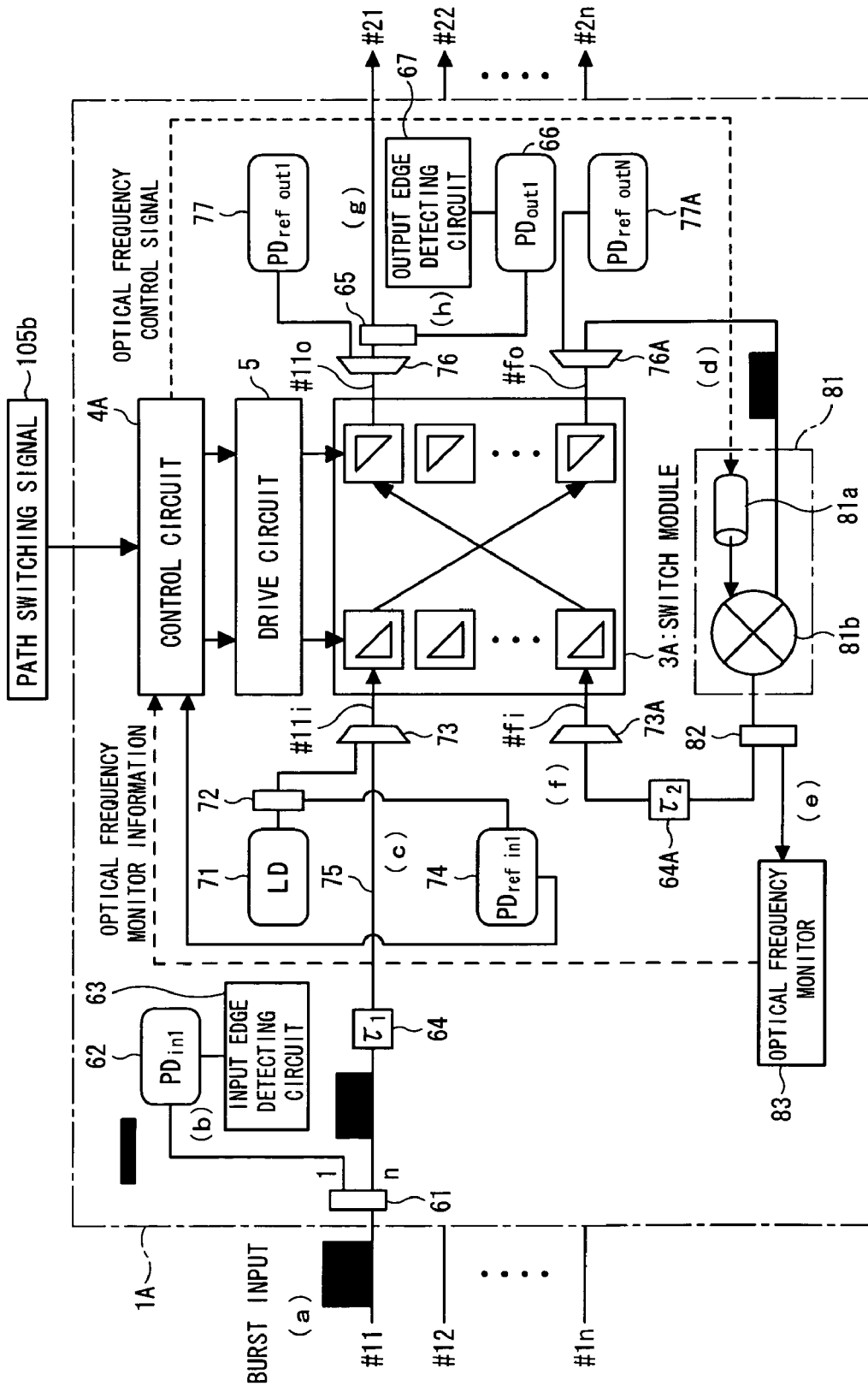
FIG. 13 shows an optical switch apparatus according to a second embodiment of the present invention.

FIG. 13 is an illustration of an optical switch apparatus 1A according to a second embodiment of the present invention. As well as the optical switch apparatus 1 according to the first embodiment, this optical switch apparatus 1A shown in FIG. 13 is also applicable to the optical switching node 105, and the optical switch apparatus 1A differs from the optical switch apparatus 1 in that a wavelength conversion function is provided with respect to inputted frame signal light.

Accordingly, in comparison with the above-described optical switch apparatus 1 according to the first embodiment, the optical switch apparatus 1A according to the second embodiment additionally has functions as a switch module 3A and a control circuit 4A and, as a configuration for realizing the wavelength conversion function, includes a wavelength demultiplexing unit 76A, a reference light output monitor 77, a wavelength converter 81, a splitter 82, an optical frequency monitor 83, an optical delaying element 64A and a multiplexing unit 73A. The configuration other than this configuration is basically similar to that of the optical switch apparatus 1 according to the first embodiment, and in FIG. 13, the same reference numerals as those in FIG. 3 designate substantially similar parts.

In this configuration, the switch module 3A includes, in addition to input terminals #11i to #1ni and output terminals #21o to #2no corresponding to the input/output ports #11 to #1n and #2n to #2n of the switching node 105, at least a pair of input/output terminals #fi and #of for the frame signal light which is an object of wavelength conversion, with the route of the frame signal light being set between these input/output terminals. In the switch module 3 according to the second embodiment, the pair of input/output terminals #fi and #of are allocated for the frame signal light undergoing the wavelength conversion.

That is, the output terminal #of for the wavelength conversion in the switch module 3 is connected through the wavelength converter 81, the splitter 82, the optical delaying element 64A and the multiplexing unit 73 to the input terminal #fi for the wavelength conversion in the switch module 3.

Moreover, the optical deflection element units 33 and 35 are driven so that, of the frame signal light inputted from the input terminals #11i to #1ni, the frame signal light to be wavelength-converted is outputted from the output terminal #of. Likewise, the optical deflection element units 33 and 35 are driven so that the frame signal light outputted through the wavelength converter 81, the splitter 82, the optical delaying element 64A and the multiplexing unit 73 is outputted from the output terminal #21o to #2no communicating from the input terminal #fi to the output ports #21 to #2n which are an output receiving side.

The wavelength converter 81 receives, through a wavelength demultiplexing unit 76A, the frame signal light outputted through the output terminal #of allocated for the frame signal light undergoing the wavelength conversion in the switch module 3 and carries out the wavelength conversion on the wavelength of this frame signal light. The frame signal light wavelength-converted can be outputted through an optical branching unit 61A, the optical delaying element 64A and the multiplexing unit 73A, which are at latter stages, to the input terminal #fi for the wavelength conversion in the switch module 3.

Moreover, the wavelength converter 81 is composed of, for example, a wavelength variable laser 81a and a conversion unit 81b. The wavelength variable laser 81 is made to be capable of outputting variable wavelength laser light according to a control signal, and the conversion unit 81*b* receives the frame signal light which is an object of wavelength conversion and converts the wavelength of this frame signal light into the laser light wavelength outputted from the wavelength variable laser 81. Incidentally, the wavelength converter is not limited to this configuration.

Figure 14:
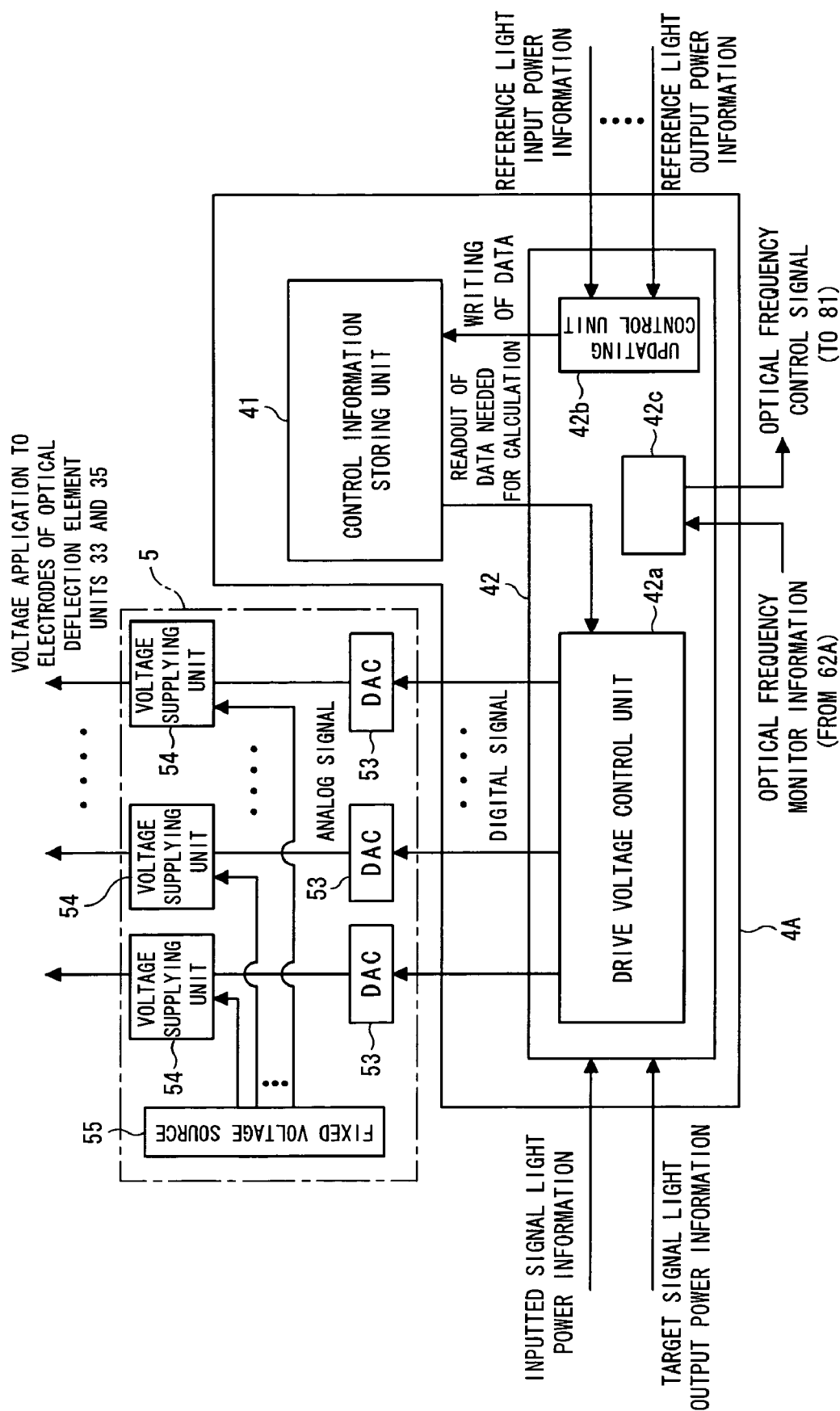
FIG. 14 shows a control circuit and a drive circuit according to the second embodiment of the present invention.

Still moreover, the control circuit 4A differs from that (see reference numeral 4) according to the first embodiment in that, as shown in FIG. 14, for controlling the wavelength to be converted with respect to the frame signal light in the conversion unit 81*b*, a conversion wavelength control unit 42*c* is provided in the processing unit 42 so as to control the output laser light wavelength of the wavelength variable laser 81*a*. The configuration other than the conversion wavelength control unit 42*c* is basically similar to the above-described control circuit 4.

The splitter 82 is interposed between the output of the wavelength converter 81 and the input terminal for the wavelength conversion in the switch module 3 for carrying out a branch on a portion of the frame signal light from the wavelength converter 81 to the switch module 3, with branched one being outputted to the optical frequency monitor 83 and the other being outputted to the optical delaying element 64A.

Moreover, the optical delaying element 64A delays the frame signal light wavelength-converted in the wavelength converter 81 and then outputs it. The delay time accomplished by the optical delaying element 64A is taken as a time needed for the optical route setting for the output of the wavelength-converted frame signal light in the switch module 3.

The multiplexing unit 73A is for, as well as the multiplexing unit 73 of the optical switch apparatus 1, multiplexing the reference light outputted from the reference light source 71 with a frame signal light line from the optical delaying element 64A, but it is properly omissible when there is no need to carry out the output power fixed control by making the reference light pass through the wavelength conversion input terminal #fi.

Thus, in the switch module 3, through the use of the drive control on the optical deflection element units 33 and 35 by the control circuit 4A and the drive circuit 5, of the frame signal light from the input terminals #11*i* to #1*ni*, the frame signal light, which requires the wavelength conversion, is once outputted from the output port #of, thereby carrying out the wavelength conversion in the wavelength converter 81. Moreover, the frame signal light wavelength-converted is again inputted through the input port #fi and outputted to the output terminals #21*o* to #2*no* which are an output receiving side.

Meanwhile, the optical frequency monitor 83 is for monitoring the optical frequency of the frame signal light wavelength-converted by the wavelength converter 81, with the monitor result being outputted to the conversion wavelength control unit 42.

In addition, the conversion wavelength control unit 42*c* of the control unit 4A functions as a wavelength feedback control unit to receive the monitor result from the aforesaid optical frequency monitor 83 for carrying out the feedback control on the wavelength converter 81 so as to correct the difference between the wavelength of the frame signal light after wavelength-converted by the wavelength converter 81 and an output light wavelength which is a target of conversion in the wavelength converter 81.

That is, in a case in which the frame signal light undergoing the wavelength conversion processing similar to that for the preceding frame signal light follows, by controlling the monitor result from the optical frequency monitor 83 as a feedback factor in the conversion wavelength control unit 42*c*, the wavelength conversion can be made so that the succeeding frame signal light becomes the output light wavelength which is the target of conversion.

Moreover, the wavelength demultiplexing unit 76A is for carrying out the wavelength demultiplexing on the reference light component for controlling the output power of the frame signal light, outputted through the output terminal #of, to the target power, and the reference light output monitor 77A is for monitoring the optical power of the reference light component from the wavelength demultiplexing unit 76A, with the monitor result being outputted to the control circuit 4A for updating the contents stored in the control information storing unit 41.

That is, the frame signal light which is an object of wavelength conversion is outputted from the output terminal #of by the drive voltage control unit 42*a*, and the optical power of the frame signal light outputted from the output terminal #of to the wavelength converter 81 is controllable to the target power.

Also in the optical switch apparatus 1A thus configured according to the second embodiment, as in the case of the above-described optical switch apparatus 1 according to the first embodiment, through the use of the optical route setting control and the variable attenuation control for the target optical power by the control circuit 4A and the drive circuit 5, it is possible to supply a drive voltage for the optical route setting control and the variable attenuation control to the corresponding optical deflection element units 33 and 35 in a response time of approximately several μs from the time of the input of the signal light.

That is, for controlling the output power to a target value with respect to the frame signal light [see FIG. 13 and (a) in FIG. 15] inputted from the input ports #11 to #1*n*, the first input monitor unit 62 monitors the optical power [see FIG. 13 and (b) in FIG. 15] and obtains the drive voltage information to the optical deflection element units 33 and 35 according to the monitor result so as to supply a drive voltage through the drive circuit 5 to the corresponding optical deflection element units 33 and 35.

In addition, the frame signal light delayed by the delay time τ1 is deflected by the optical deflection element units 33 and 35 driven as mentioned above so as to be outputted through the output terminals #21*o* to #2*no* communicating with the output ports #21 to #2*n* which are an output receiving side, thereby carrying out the route switching on the inputted frame signal light and setting the optical power of the frame signal light outputted from each output port at a target power.

Still additionally, in a case in which, in addition to the optical route switching, the wavelength conversion becomes necessary, the switch module 3 once outputs the corresponding frame signal light [see FIG. 13 and (c) in FIG. 15] from the output port #of [see FIG. 13 and (d) in FIG. 15]. In this way, the wavelength conversion is made by the wavelength converter 81 under control of the conversion wavelength control unit 42*c* [see FIG. 13 and (e) in FIG. 15]. At this time, the output power of the frame signal light inputted to the wavelength converter 81 can also be set at the target power by driving the optical deflection element unit 35 in terms of the output terminal #of, which can contribute to the stabilization of the wavelength conversion characteristic in the latter-stage wavelength converter 81.

Yet additionally, after delayed by a required time by the optical delaying element 64A [see FIG. 13 and (f) in FIG. 15], the frame signal light wavelength-converted is again inputted through the input port #fi and then outputted to the output terminal #21o to #2no which are an output receiving side [see FIG. 13 and (g) in FIG. 15], thereby achieving the optical route switching in units of frame signal light and the wavelength conversion.

Furthermore, when the output edge detecting circuit 67 detects the passage of the frame signal light [see FIG. 13 and (h) in FIG. 15], the control circuit 4 resets the drive voltage supply control for this frame signal light to the switch module 3.

Meanwhile, with respect to the delay time τ2 by the aforesaid optical delaying element 64A, after the frame signal light outputted through the output terminal #of is wavelength-converted by the wavelength converter 81, a delay is made till at least the timing that the drive control for the optical deflection element units 33 and 35 for the optical route setting between the input terminal #fi and the output terminals #21o to #2no, which are an output receiving side, in the switch module 3A reaches completion.

For example, in a case in which the drive voltage control unit 42a of the control circuit 4A first carries out the drive control on the optical deflection element units 33 and 35 for setting an optical route communicating with the wavelength converter 81 (that is, optical route between the input terminals #11i to #1ni and the output terminal #of) with respect to the frame signal light from the input ports #11 to #1n and secondly carries out the drive control on the optical deflection element units 33 and 35 for setting an optical route leading the wavelength-converted frame signal light to the output ports #21 to #2n which are an output receiving side (that is, optical route between the input terminal #fi and the output terminals #21o to #2no), at least the time obtained by subtracting the time needed for the wavelength conversion processing by the wavelength converter 81 from the time needed for the setting of the optical route between the input terminal #fi and the output terminals #21o to #2no is set as the delay time τ2.

However, in a case in which the drive voltage control unit 42a can simultaneously conduct the setting of the aforesaid two optical routes, since both the optical route between the input terminals #11i to #1ni and the output terminal #of and the optical route between the input terminal #fi and the output terminals #21o to #2no are set during the delay time τ1 made by the optical delaying element 64, the optical delay element 64A is omissible.

Also with respect to the frame signal light inputted to the input terminal #fi, as well as the frame signal light inputted from the input ports #11 to #1n to the input terminals #11i to #1ni, when the output power at the output through the output ports #21 to #2n is controlled to a target value, as the delay time τ2 to be established by the optical delaying element 64A, a delay time equal to the time τ1 to be established by the aforesaid optical delaying element 64 becomes necessary.

That is, in a case in which, with respect to the frame signal light wavelength-converted by the wavelength converter 81, the output power is controlled to a target value, as well as the frame signal light from the input ports #11 to #1n, it is required that the optical power be monitored by a function unit similar to the first input monitor unit 62 so that the drive voltage control unit 42a derives the drive voltage information for the optical deflection element units 33 and 35 according to the monitor result and supplies the drive voltage through the drive circuit 5 to the corresponding optical deflection element units 33 and 35. Since such processing using the control circuit 4A and the drive circuit 5 becomes necessary, the above-mentioned delay time τ1 becomes necessary to the optical delaying element unit 64A.

As described above, according to the second embodiment of the present invention, it is possible to continuously carry out the route switching on frame signal light inputted from various routes while eliminating differences in output power value and further to carry out an optical wavelength conversion in units of frame signal light.

[C] Others

It should be understood that the present invention is not limited to the above-described embodiments, and that it is intended to cover all changes and modifications of the embodiments of the invention herein which do not constitute departures from the spirit and scope of the invention.

The above disclosure of the embodiments according to the present invention enables manufacturing the apparatus and system according to the present invention.

What is claimed is:

1. An optical switch apparatus designed to output frame signal light from a plurality of input ports to one of a plurality of output ports in a switching fashion, comprising:
   a switch module for deflecting frame signal light from each of input terminals associated with said input ports through the use of supply of a drive voltage to output said frame signal light to one of output terminals associated with said plurality of output ports in a switching fashion;
   a plurality of first branching units interposed between said input ports and said input terminals for carrying out a branch on a portion of said frame signal light from said input ports to said switch module;
   a plurality of first input power monitors for monitoring optical power of the branched frame signal light from each of said first branching units;
   a drive voltage supply control unit for controlling supply of a drive voltage to said switch module on the basis of a result of the monitor of said frame signal light from each of said first input power monitors so as to control an optical route for said frame signal light; and
   first delaying units each for delaying input of said frame signal light to said switch module until the drive voltage supply control on said frame signal light in said drive voltage supply control unit reaches a stable condition, with each of said first delaying units being interposed between said first branching units and said input terminals, respectively.

2. The optical switch apparatus according to claim 1, wherein said drive voltage supply control unit is made to control the supply of said drive voltage to said switch module for controlling, in addition to said optical route for said frame signal light, output power of said frame signal light to be outputted from said output port on the basis of a result of the monitor of said frame signal light from said input power monitor.

3. The optical switch apparatus according to claim 2, wherein said drive voltage supply control unit includes:
   a control information storing unit for storing control information for setting optical routes through which said frame signal light propagate between said plurality of input ports and said plurality of output ports;
   a drive voltage control unit for making reference to the contents of said control information storing unit on the basis of the monitor result to output a control signal for controlling a drive voltage to be supplied to said switch module so as to control said optical routes for said frame signal light and output power of frame signal light to be outputted from said output ports; and a drive voltage supplying unit for supplying, to said switch module, the drive voltage controlled by said control signal from said drive voltage control unit.

4. The optical switch apparatus according to claim 1, wherein said drive voltage supply control unit is made to receive, in addition to optical route setting information on said frame signal light, target output power information on frame signal light to be outputted from said output ports as frame signal light control information transmitted together with said frame signal light.

5. The optical switch apparatus according to claim 3, further comprising an updating unit for making reference light pass through an optical route set by supplying a drive voltage based on control information on an object of updating in said control information storing unit to said switch module to update the contents of said control information on the object of updating in said control information storing unit on the basis of input/output power characteristics of said reference light passing through said optical route.

6. The optical switch apparatus according to claim 5, wherein said updating unit includes:
   a reference light outputting unit for outputting said reference light to the input terminal constituting said optical route of the object of updating in said switch module;
   a reference light monitoring unit for monitoring an output power characteristic from the output terminal constituting said optical route of the object of updating in said switch module; and
   an updating control unit for controlling the updating of the control information on the object of updating in said control information storing unit on the basis of a result of the monitor from said reference light monitoring unit.

7. The optical switch apparatus according to claim 6, wherein said reference light outputting unit outputs, as said reference light, light in a wavelength band other than a wavelength of said signal light to a plurality of input-side deflecting units.

8. The optical switch apparatus according to claim 1, further comprising a wavelength converter for carrying out a wavelength conversion on the frame signal light outputted through one of said output terminals in said switch module so that the frame signal light wavelength-converted by said wavelength converter is inputted to one of said input terminals in said switch module.

9. The optical switch apparatus according to claim 8, further comprising:
   a second branching unit interposed between output of said wavelength converter and one of said input terminals of said switch module for carrying out a branch on a portion of the frame signal light from said wavelength converter to said switch module;
   a second input power monitor for monitoring optical power of the branched frame signal light from said second branching unit so that, on the basis of a result of the monitor of the wavelength-converted signal light from said second input power monitor, said drive voltage supply control unit controls the supply of a drive voltage to said switch module to control an optical route of said frame signal light; and
   a second delaying unit interposed between said second branching unit and the one input terminal for delaying input of said frame signal light to said switch module until the supply control of said drive voltage on said frame signal light in said drive voltage supply control unit reaches a stable condition.

10. The optical switch apparatus according to claim 8, further comprising an optical frequency monitoring circuit for monitoring an optical frequency of the frame signal light wavelength-converted by said wavelength converter.

11. The optical switch apparatus according to claim 10, further comprising a wavelength feedback control unit for feedback-controlling said wavelength converter on the basis of a result of the monitor by said optical frequency monitoring circuit so as to make a correction on a difference occurring between a wavelength of said frame signal light after wavelength-converted and an output light wavelength forming a target of conversion in said wavelength converter.

12. The optical switch apparatus according to claim 1, further comprising:
   an output power monitor for monitoring optical power of said frame signal light to be led from said output terminals to said output ports in said switch module; and
   a passage detecting unit for detecting passage of said frame signal light from said output terminals to said output ports in said switch module on the basis of a result of the monitor by said output power monitor so that, when said passage detecting unit detects the passage of said frame signal light, said drive voltage supply control unit resets the control on the drive voltage supply to said switch module for said frame signal light.

13. The optical switch apparatus according to claim 1, wherein said drive voltage supply control unit carries out feedback control to correct a difference between output power of frame signal light to be led to said output ports and target output power of frame signal light to be outputted from said output ports on the basis of a result of the output power monitor by said output power monitor.

14. The optical switch apparatus according to claim 1, further comprising an input edge detecting circuit for detecting an input edge of frame signal light on the basis of a result of the monitor from said first input power monitor so that, when said input edge detecting circuit detects said input edge, said drive voltage supply control unit starts the supply control on a drive voltage to said switch module.

15. The optical switch apparatus according to claim 1, wherein said drive voltage supply control unit receives trigger information for the start of the drive voltage supply control to said switch module as frame signal light control information transmitted together with said frame signal light.

16. An optical switching system made up of a transmission node for transmitting frame signal light in which transmitted data is modulated, a reception node for receiving said frame signal light from said transmission node through a network and an optical switching node for setting a path provided on said network, through which said frame signal light propagates, in a switching fashion, wherein said optical switching node comprises a monitoring unit for monitoring optical power of said frame signal light inputted from said transmission node and a power adjusting unit for variably adjusting optical power of frame signal light to said reception node, and
   said transmission node comprises a bit pattern processing unit for processing a bit pattern of the transmitted data to stabilize optical power of said frame signal light to be monitored by said monitoring unit and a frame signal light producing unit for producing frame signal light to be transmitted on the basis of the bit pattern processed by said bit pattern processing unit, wherein said optical switching node forms an optical switch apparatus made to output frame signal light from a plurality of input ports to one of a plurality of output ports in a switching fashion, and said optical switch apparatus comprises:

a switch module for deflecting frame signal light from each of input terminals associated with said input ports through the use of supply of a drive voltage to output said frame signal light to one of output terminals associated with said plurality of output ports in a switching fashion, a plurality of first branching units interposed between said input ports and said input terminals for carrying out a branch on a portion of frame signal light from said input ports to said switch module, a plurality of first input power monitors for monitoring optical power of the branched frame signal light from said first branching units, a drive voltage supply control unit for controlling supply of a drive voltage to said switch module on the basis of a result of the monitor of said frame signal light from said first input power monitors so as to control an optical route for said frame signal light, and first delaying units for delaying input of said frame signal light to said switch module until the drive voltage supply control on said frame signal light in said drive voltage supply control unit reaches a stable condition, with each of said first delaying units being interposed between said first branching units and said input terminals, respectively.

* * * * *